US011500915B2

(12) United States Patent
Nguyen et al.

(10) Patent No.: US 11,500,915 B2
(45) Date of Patent: Nov. 15, 2022

(54) SYSTEM AND METHOD TO INDEX TRAINING CONTENT OF A TRAINING SYSTEM

(71) Applicant: Rockwell Automation Technologies, Inc., Mayfield Heights, OH (US)

(72) Inventors: Thong T. Nguyen, New Berlin, WI (US); Paul D. Schmirler, Glendale, WI (US); Timothy T. Duffy, Franklin, WI (US); Hannah M. Schermerhorn, Wauwatosa, WI (US); Jingbo Liu, Grafton, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 484 days.

(21) Appl. No.: 16/560,696

(22) Filed: Sep. 4, 2019

(65) Prior Publication Data

US 2021/0064646 A1    Mar. 4, 2021

(51) Int. Cl.
*G06F 16/41*  (2019.01)
*G06F 16/438*  (2019.01)
*G06F 16/432*  (2019.01)
*G09B 19/00*  (2006.01)

(52) U.S. Cl.
CPC ............ *G06F 16/41* (2019.01); *G06F 16/433* (2019.01); *G06F 16/434* (2019.01); *G06F 16/4387* (2019.01); *G09B 19/00* (2013.01)

(58) Field of Classification Search
CPC ...... G06F 16/41; G06F 16/434; G06F 16/433; G06F 16/4387
USPC ......................................................... 707/741
See application file for complete search history.

(56) References Cited

U.S. PATENT DOCUMENTS

| | | | |
|---|---|---|---|
| 2015/0079565 A1* | 3/2015 | Miller | .................... G09B 23/28 434/252 |
| 2015/0365725 A1* | 12/2015 | Belyaev | ............. H04N 21/8133 725/46 |
| 2018/0011860 A1* | 1/2018 | Barhate | ................. G06F 16/489 |

* cited by examiner

*Primary Examiner* — Kimberly L Wilson
(74) *Attorney, Agent, or Firm* — Fletcher Yoder, P.C.

(57) ABSTRACT

A non-transitory computer-readable medium includes computer-executable instructions that, when executed by at least one processor, may cause the at least one processor to retrieve a first training profile of a plurality of training profiles from a database, identify a plurality of index keywords in a respective training content of the first training profile, in which the respective training content includes audio data, video data, or both, and divide the first training profile into a plurality of sections based on the plurality of index keywords. Each of the plurality of sections is selectable for playback.

18 Claims, 6 Drawing Sheets

SYSTEM AND METHOD TO INDEX TRAINING CONTENT OF A TRAINING SYSTEM

BACKGROUND

The disclosure relates generally to providing assistance to a field user performing certain tasks in an industrial environment via a training system. More particularly, embodiments of the present disclosure are related to systems and methods for generating, modifying, and optimizing content to be presented to the field user by the training system.

This section is intended to introduce the reader to various aspects of art that may be related to various aspects of the present techniques and are described and/or claimed below. This discussion is believed to be helpful in providing the reader with background information to facilitate a better understanding of the various aspects of the present disclosure. Accordingly, it should be noted that these statements are to be read in this light, and not as admissions of prior art.

A training system may be used to assist a field user to perform a desired task. For instance, the training system may present content to the field user, including visual elements, which may be seen by the field user, and/or audio elements, which may be heard by the field user. The visual and audio elements may guide the field user to perform the desired task. In some embodiments, the content presented by the training system may include real-world content and computer-generated or virtual content that may provide interactive content to better enable the field user to perform the desired task. However, before the video and/or audio elements can be used to guide the field user, these elements are created for each individual task that a field user may perform. With this in mind, it may be useful to provide improved systems and methods for creating content that is presented by the training system and that effectively guides the field user in performing these various tasks.

BRIEF DESCRIPTION

A summary of certain embodiments disclosed herein is set forth below. It should be noted that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a non-transitory computer-readable medium includes computer-executable instructions that, when executed by at least one processor, may cause the at least one processor to retrieve a first training profile of a plurality of training profiles from a database, identify a plurality of index keywords in a respective training content of the first training profile, in which the respective training content includes audio data, video data, or both, and divide the first training profile into a plurality of sections based on the plurality of index keywords. Each of the plurality of sections is selectable for playback.

In another embodiment, a method includes receiving, via a processor, an inquiry from a user, in which the inquiry comprises a request for assistance to perform a first operation of one or more operations for one or more industrial automation components, and retrieving, via the processor, a selected training profile from a database based on the inquiry, in which the selected training profile is associated with the first operation of the one or more operations for the one or more industrial automation components, and the selected training profile includes a plurality of sections based on a plurality of index keywords, in which each of the plurality of sections is selectable for playback. The method further includes presenting, via the processor, the selected training profile to the user, and receiving, via the processor, feedback data from the user, in which the feedback data comprises a first index keyword of the plurality of index keywords, identifying, via the processor, a selected section of the plurality of sections associated with the first index keyword in response to receiving the feedback data from the user, and presenting, via the processor, the selected section of the selected training profile to the user.

In another embodiment, a system, includes a database configured to store a plurality of index keywords and includes a virtual expert system communicatively coupled to the database. The virtual expert system is configured to receive feedback data from a remote expert system, in which the feedback data comprises a subset of index keywords of the plurality of index keywords, and generate a training profile based on the feedback data, in which the training profile is associated with an operation for one or more industrial automation components, in which the training profile comprises a plurality of sections, and in which each section of the plurality of sections is associated with an index keyword of the subset of index keywords. The virtual expert system may store the training profile on the database.

DRAWINGS

These and other features, aspects, and advantages of the present disclosure will become better noted when the following detailed description is read with reference to the accompanying drawings in which like characters represent like parts throughout the drawings, wherein.

DETAILED DESCRIPTION

Figure 1:
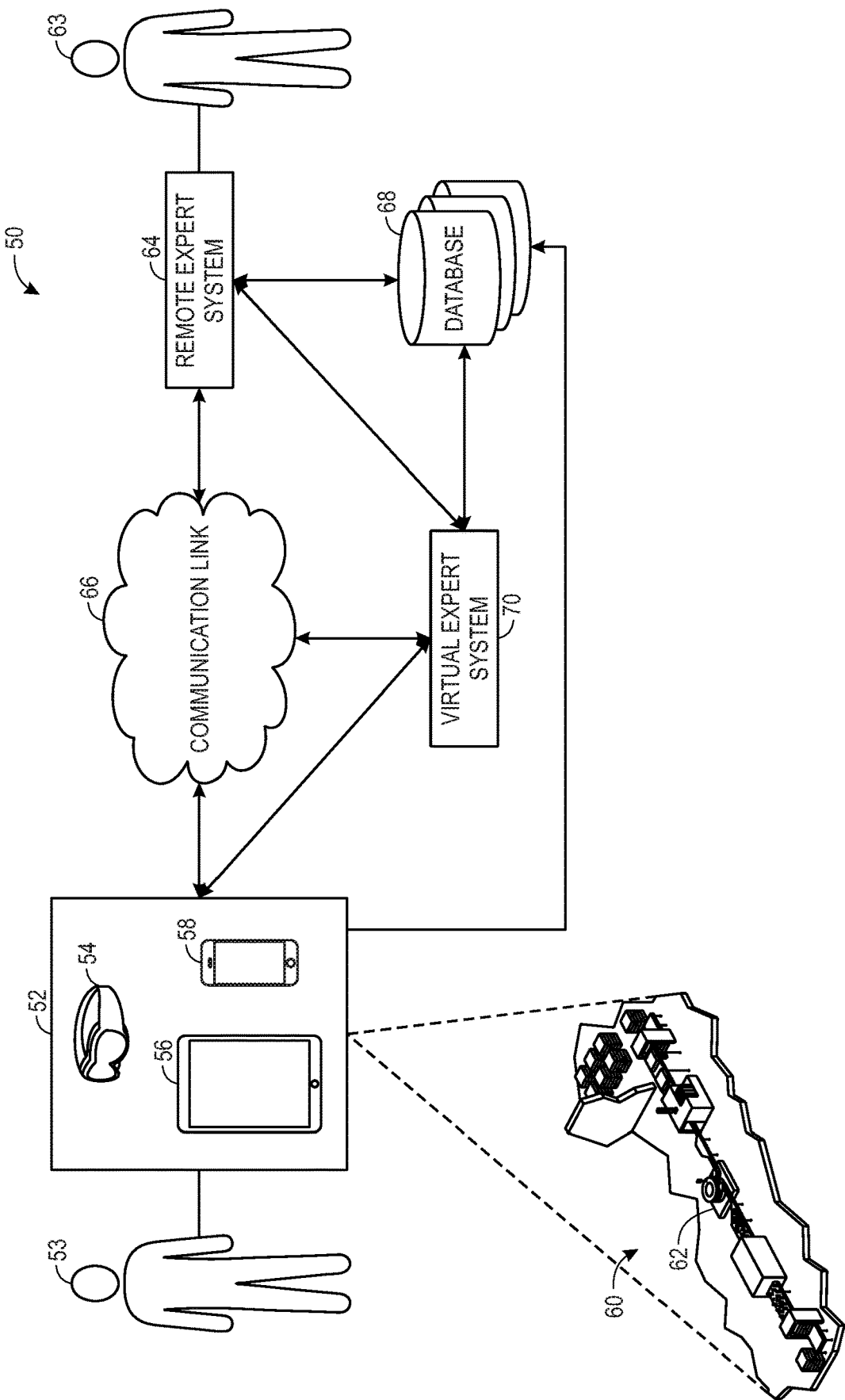
FIG. 1 is a schematic of an embodiment of a training network that may be used to provide instructions to assist field users to perform different tasks within, for example, an industrial system, in accordance with an embodiment of the present disclosure.

One or more specific embodiments of the present disclosure will be described below. In an effort to provide a concise description of these embodiments, all features of an actual implementation may not be described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

The present disclosure is generally directed toward a training system that may present content (e.g., virtual elements) to a field user of the training system to assist the field user to perform a desired task. As used herein, a training system refers to any set of components or devices that may communicate with other devices, process data, display visualizations of an environment (e.g., an industrial system), and the like. The visualizations may include real-world surroundings and/or virtual elements. For example, the training system may use virtual reality, which primarily includes a virtual environment, augmented reality, which may overlay virtual elements on top of a real-world surrounding, mixed reality, which combines the real-world surroundings with virtual elements that may be interactive with the real-world surroundings, and/or other extended reality features. The combination of real-world content and virtual content may provide the field user with different types of information to facilitate guiding the field user to perform the desired task. As an example, the training system may determine features of the real-world surroundings to generate the virtual elements (e.g., text instructions, virtual arrows pointing to real objects) that may be used to guide the field user to perform the desired task in the context of the real-world surroundings.

With the foregoing in mind, it may be difficult to design or otherwise configure the training system to generate content that effectively enables the field user to perform any suitable task that the field user may be requested to perform. For instance, it may be difficult to determine the type of information that should be provided by the training system and/or a manner in which to present the information to the field user and effectively assist the field user to perform any particular task. Moreover, it may tedious or costly to generate individual content presentable by the training system for any suitable task. As an example, a remote expert may have to produce (e.g., program, graphically design) each feature that may be presented to the training system user to help guide the training system field user in performing a respective task. If modifications to the content are to be made, the remote expert may have to reprogram or revise certain features (e.g., program code) related to the existing training content to include the modifications. In some circumstances, even after the training content is generated by the remote expert, the remote expert or a testing user may have to test the adjusted content and repeat the modification steps for several iterations to determine that the content has been modified as desired. As such, generating content may be a time consuming and inefficient process.

Keeping this in mind, embodiments of the present disclosure include techniques that may enable the training system to present information in an effective manner that may assist the field user in performing certain operations, while automatically and concurrently generating content for future training or instructional operations. Such techniques may be enabled by placing the training system in communication with a remote expert system operated by a remote expert that may interact with the field user. The remote expert may assist the field user by providing instructions and/or visual indicators related to the field user's tasks. The techniques described herein may allow the training system to automatically generate training content for another field user of the training system to use when performing a similar task in the future. In some embodiments, the training content is generated based on the captured (e.g., recorded audio and image or other visual data) interaction between the field user and the remote expert while performing a particular task via the training system. For example, the training content may include recorded steps based on instructions (e.g., verbal guidelines) provided by the remote expert and a response provided by the field user indicating a completed step, as performed via the training system. Such training content may be stored and may be retrieved from a database or other suitable storage component at a later time, so as to instruct a future field user to perform a similar or the same task. Additionally, the training system may automatically detect a variant or unexpected response or feedback provided by the future field user indicating a particular step could not be completed, such as due to an unclear instruction. The training system may use an artificial intelligence component or machine learning algorithms to update the training content to help another future field user to complete the respective task with clearer instructions or details. As such, the training system may automatically generate and adjust training content to assist future field users in performing the particular task.

Additionally, since the training system may operate in an environment where natural language may be communicated between the field user of the training system and the remote expert, in certain embodiments, the training system may interpret certain individual commands provided by the field user or the remote expert as an indicator or prompt to perform multiple operations. In other words, the training system may receive a single command from the field user or the remote expert and perform multiple operations based on the single command. In one example, the remote expert may provide certain feedback or instructions to the field user to view a particular object. In response, the training system may interpret the command provided to the field user via natural language as a command to generate a visual indicator (e.g., virtual arrow) for display via the training system to allow the field user to identify a position of the particular object without having the remote expert provide additional specific instructions or input commands to the training system. In addition to generating visual indicators, the training system may retrieve a resource associated with the particular object and present the resource to the field user so as to provide additional information (e.g., data, instructions) to assist the field user to perform an action based on the detected communication between the remote expert and the field user.

Furthermore, after training content is generated by the training system, it may be prudent to provide an efficient manner to review different portions of the training content. That is, if a field user wishes to perform a certain task again, the field user may wish to perform just a portion of the task, as opposed to the entire task. For example, when assembling a motor drive system, the training content may include a number of steps from verifying the operation of a drive, the connections between the drive and a motor, and software update that may be part of the motor drive system's controller. To provide the field user with the ability to review a portion of the training content, the training system may index the training content. As an example, while generating training content, the training system may recognize certain characteristics (e.g., keywords) of feedback provided by the remote expert and/or the field user. The training system may use such feedback to divide the training content into different sections that are each available for playback and presentation. When the training content is retrieved to enable a future field user to perform a task, the training system may present a list of sections of the training content for the future field user to select whether to view the entire training content or a particular portion of the training content.

For purposes of discussion, the description of the training system provided herein is made with reference to performing a task in an industrial environment. However, it should be noted that the training system, as described herein, is not limited to such environments. The training system may be used in various other fields and applications. For example, the training system may be applied to performing tasks in an athletic environment, an academic environment, a natural environment, and so forth.

Turning to the drawings, FIG. 1 is a schematic of an embodiment of a training network 50 that may be used to provide instructions to perform different tasks. The training network 50 may include a training system 52, which may be utilized by a field user 53. For instance, the training system 52 may include a headset 54 or other wearable device, a tablet 56, a mobile phone 58, another suitable device, or any combination thereof. In the illustrated embodiment, the field user 53 is interacting with an industrial system 60, which may include an industrial plant, a factory, and the like. As an example, field user 53 may be performing an action (e.g., operating, maintaining) on an industrial device 62 (e.g., an industrial automation component), such as a controller, a drive, a motor, a sensor, a conveyor, an input/output (I/O) module, a motor control center, a human machine interface (HMI), a user interface, contactors, a starter, a relay, a protection device, a switchgear, a compressor, a network switch (e.g., an Ethernet switches), a scanner, a gauge, a valve, a flow meter, etc. In additional embodiments, the field user 53 may be performing an action in any other suitable setting, and the field user 53 may utilize the techniques described in this disclosure to facilitate performing the action.

The field user 53 may utilize the training system 52 to facilitate an operation or task to be performed with the industrial system 60. For instance, the training system 52 may display an image combining real-world content and computer-generated elements to the field user 53. The real-world content may include the industrial system 60, and the computer-generated elements may include additional visual and/or audio elements to supplement the real-world content with additional details, such as information regarding the industrial system 60 and/or the industrial device 62. In some embodiments, the field user 53 may interact with the image displayed by the training system 52. For example, the field user 53 may perform various physical gestures or voice commands indicative of a tilt command, a rotate command, a zoom in command, a zoom out command, a data provision command, or the like. As the field user 53 interacts with the image and/or with the industrial system 60, the training system 52 may update the displayed image, such as by displaying different computer-generated elements.

In some cases, the training system 52 may not provide sufficient or clear instructions to assist the field user 53 to perform a desired task associated with the industrial system 60. As a result, the field user 53 may request that the training system 52 provide for additional assistance to complete the desired task. In certain embodiments, the training system 52 may then place the field user 53 in communication with a remote expert 63 of a remote expert system 64. As used herein, the remote expert 63 may be a different field user that may have certain knowledge, experience, and/or other expertise regarding the industrial system 60 and/or the industrial device 62, and may further assist the field user 53 to perform the desired task. The remote expert 63 may also be located within the industrial system 60, or the remote expert 63 may be located outside of the industrial system 60, such as in a different geographic location. The remote expert 63 may use the remote expert system 64, which may include a computing system (e.g., a memory, processor, display) to enable the remote expert 63 to communicate with the field user 53, such as to enable information to be transferred between the field user 53 and the remote expert 63.

In the illustrated embodiment, the training system 52 may include a communication link 66 that may permit data exchange between components of the training network 50 (e.g., between the training system 52 and the remote expert system 64). For instance, the communication link 66 may include any wired or wireless network that may be implemented as a local area network (LAN), a wide area network (WAN), and the like. The communication link 66 may receive certain data, such as the image data (e.g., a single image, multiple images, a video, multiple videos) displayed by the training system 52 and may also display the received data to the remote expert 63 via the remote expert system 64. As such, the remote expert 63 may view the image data presented by the training system 52 to the field user 53 to enable the remote expert 63 to assist the field user 53. Additionally, the communication link 66 may transfer feedback data between the field user 53 and the remote expert 63. By way of example, audio (e.g., speech) input and/or text input presented by the remote expert 63 via the remote expert system 64 may be transmitted to the training system 52 for viewing by the field user 53 (e.g., presented by the training system 52). Thus, the communication link 66 may enable the field user 53 to communicate with the remote expert 63 and vice versa. The remote expert 63 may use the remote expert system 64 to access one or more databases 68 that stores data, such as resources, that may be retrieved by the remote expert 63. The remote expert 63 may use the retrieved data to help assist the field user 53, such as by acquiring relevant information (e.g., procedural information, statistical information). In some embodiments, the database(s) 68 are cloud-based databases. In additional embodiments, the database(s) 68 may include a physical memory, such as a flash memory, a hard drive, a server, and so forth.

In further embodiments, the training network 50 may include a virtual expert system 70 that may also provide assistance to the field user 53 to perform the desired task. The virtual expert system 70 may be a computing system that is separate from the remote expert system 64 and/or the training system 52 and may present certain pre-programmed or pre-stored information for display to the field user 53 via the training system 52 upon activation of the virtual expert system 70. For instance, the virtual expert system 70 may transmit information (e.g., procedural instructions, resource information) to the training system 52 (e.g., via the communication link 66), and the training system 52 may present the information to the field user 53 to assist the field user 53 to perform the desired task. Such information may be organized as training content of a training profile that may be stored in the database 68 and will be further discussed herein with respect to FIG. 3. In addition to operating based on pre-programmed or pre-stored information, the virtual expert system 70 may be an artificial intelligence (AI) system that employs certain machine learning algorithms to identify trends, patterns, and other discernable characteristics from image data and audio data acquired while a remote expert 63 is assisting the field user 53 via the training system 52.

Generally, a training profile may include training content that is presented to the field user 53 to guide the field user 53 to perform a particular task, such as in the context of the industrial system 60. The training system 52 may present the training content in any suitable manner, such as with a video (e.g., presentation of performed actions), audio content (e.g., spoken instructions), text, visual indicators overlaid with real objects, a video and overlaid text, a video and audio content (e.g., spoken instructions), visual indicators and overlaid text, visual indicators and audio content, another suitable method, or any combination thereof. The manner at which the training system 52 presents the training content may be selectable (e.g., indicated by the field user 53). In one example method of presenting the training content, the virtual expert system 70 may be used in conjunction with the remote expert system 64, such that the field user 53 may receive information from both the virtual expert system 70 and the remote expert 63 via the remote expert system 64. In another example, the virtual expert system 70 may be used as a substitute for the remote expert system 64. That is, the training system 52 may be placed in communication with the virtual expert system 70 without being in communication with the remote expert 63. Thus, the field user 53 may receive information from the virtual expert system 70 via the training system 52 and may not receive information from the remote expert 63.

Figure 2:
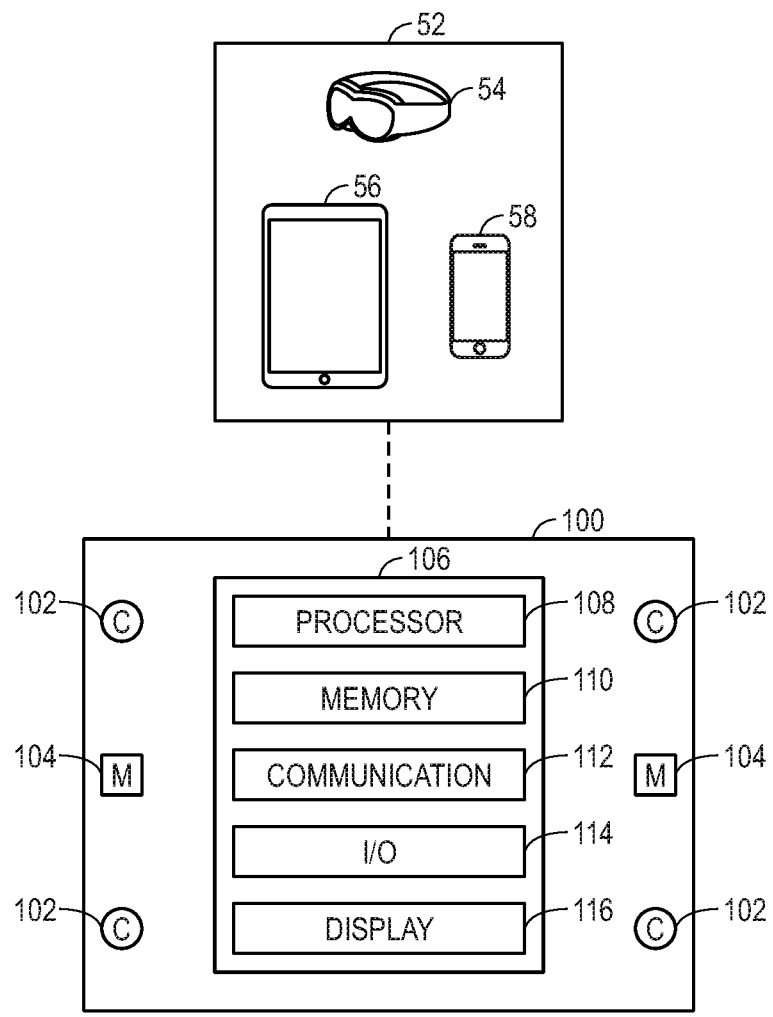
FIG. 2 is a schematic of an embodiment of a computing system that may be utilized by a training system that may be a part of the training network, in accordance with an embodiment of the present disclosure.

FIG. 2 is a schematic of an embodiment of a computing system 100 that may be utilized by the training system 52 to perform the techniques described herein. The computing system 100 may include one or more cameras or image sensors 102 and one or more microphones or audio sensors 104. Generally, the training system 52 may receive image data via the camera(s) 102 and audio data via the microphone(s) 104. It should be noted that although FIG. 2 illustrates the computing system 100 as having four cameras 102 and two microphones 104, the computing system 100 may have any suitable number of cameras 102 and microphones 104, such as a single camera 102 and/or a single microphone 104. In additional embodiments, the computing system 100 may include one or more sensors for detecting the movements, such as a gesture made by the field user 53, a physical orientation of the field user 53, a gaze of the field user 53 (e.g., a perspective of the field user 53 surpassing a time threshold), a movement of the surroundings (e.g., the industrial system 60) of the field user 53, and so forth. For example, the computing system 100 may include an infrared sensor, a thermal sensor, a range sensor (e.g., a range camera), a smell sensor (e.g., an electronic nose), or any other suitable sensors for detecting characteristics of the field user 53 and/or the surroundings of the field user 53.

The computing system 100 may also include processing circuitry 106 having a processor 108, a memory 110, a communication component 112, input/output (I/O) 114, a display 116, and the like. The communication component 112 may be a wireless or a wired communication component that may facilitate establishing a connection with the communication link 66 to facilitate communication between the training system 52 and the remote expert system 64 and/or the virtual expert system 70. This wired or wireless communication component may include any suitable communication protocol including Wi-Fi, mobile telecommunications technology (e.g., 2G, 3G, 4G, LTE), Bluetooth®, near-field communications technology, and the like. The communication component 112 may include a network interface to enable communication via various protocols such as Ether-Net/IP®, ControlNet®, DeviceNet®, or any other industrial communication network protocol.

The processor 108 of the computing system 100 may be any suitable type of computer processor or microprocessor capable of executing computer-executable code, including but not limited to one or more field programmable gate arrays (FPGA), application-specific integrated circuits (ASIC), programmable logic devices (PLD), programmable logic arrays (PLA), and the like. The processor 108 may, in some embodiments, include multiple processors. The memory 110 may include any suitable articles of manufacture that serve as media to store processor-executable code, data, and the like. The memory 110 may store non-transitory processor-executable code used by the processor 108 to perform the presently disclosed techniques, such as to create an augmented reality image to be displayed to the field user 53.

The I/O ports 114 may enable the computing system 100 to communicatively couple to other external devices, such as the camera(s) 102, the microphone(s) 104, external memory, and so forth. Furthermore, the display 116 may be any suitable image-transmitting component that displays an image. For example, the display 116 may be a display screen that combines real-world image data associated with the field user's physical surroundings with computer-generated image data associated with computer-generated elements to supplement the real-world image data. In another example, the computing system 100 may include a transparent display to enable the field user 53 to view the real-world surroundings, and the display 116 may display computer-generated content that is superimposed over the transparent display to produce virtual elements within the real-world surroundings.

It should be noted that the remote expert system 64, the virtual expert system 70, and other control or computing systems described herein may include one or more components similar to the computing system 100. For instance, the remote expert system 64 may include a separate display 116 that may display the image displayed to the field user 53, such that the remote expert 63 may visually observe the real-world surroundings from the perspective of the field user 53. As such, the remote expert system 64 may also include the camera(s) 102 that may receive image data (e.g., associated with a gesture, a gaze, an orientation of the field user 53) and the microphone(s) 104 that may receive audio data (e.g., audio feedback) from the remote expert 63. The remote expert system 64 may receive the image data and the audio data acquired by the training system 52 to assist the field user 53 to perform the desired task. Additionally, the remote expert system 64 may receive other data acquired by the training system 52, including geographic location data, biofeedback data (e.g., heart rate, respiration rate, body temperature, brain waves), environmental data, any other suitable data, or any combination thereof. By way of example, the remote expert 63 may determine a status of the field user 53 based on the biofeedback data, such as whether the field user 53 has a heart rate above some threshold while performing the desired task, and the remote expert 63 may instruct the field user 53 to rest before proceeding with remaining instructions to complete the desired task. In another example, the environmental data may include temperature and humidity of a surrounding of the field user 53, and the remote expert 63 may instruct the field user 53 to perform tasks with the environmental data in mind (e.g., to avoid contacting a part of industrial device 62 that may be hot). As such, the remote expert 63 may use various data acquired by the training system 52 to assist the field user 53. In certain embodiments, based on the image data, the audio data, and/or the other data received from the remote expert 63, the remote expert system 64 may instruct the training system 52 to adjust the image displayed to the field user 53.

Figure 4:
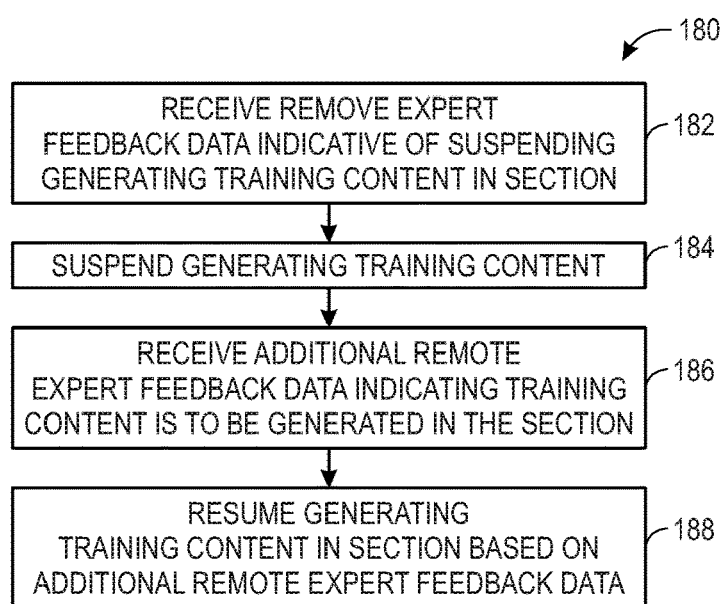
FIG. 4 is a flowchart of an embodiment of a method or process for pausing the generation of training content while the field user is communicatively connected to the remote expert, in accordance with an embodiment of the present disclosure.
Figure 5:
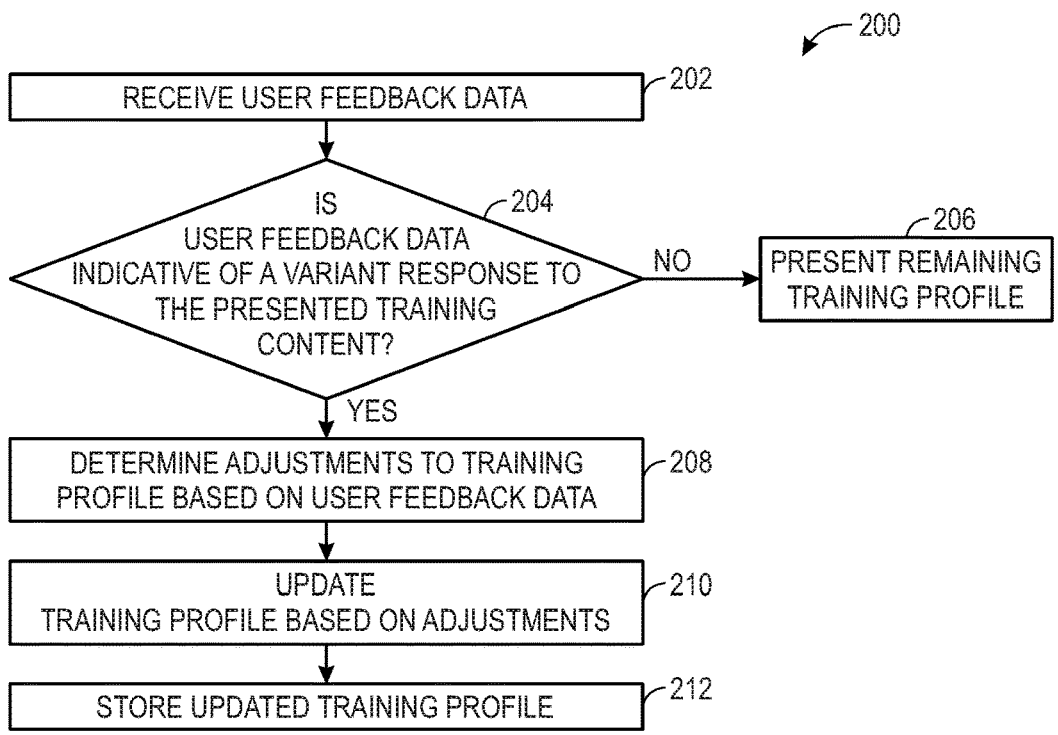
FIG. 5 is a flowchart of an embodiment of a method or process for adjusting the training profile based on user feedback data, in accordance with an embodiment of the present disclosure.
Figure 6:
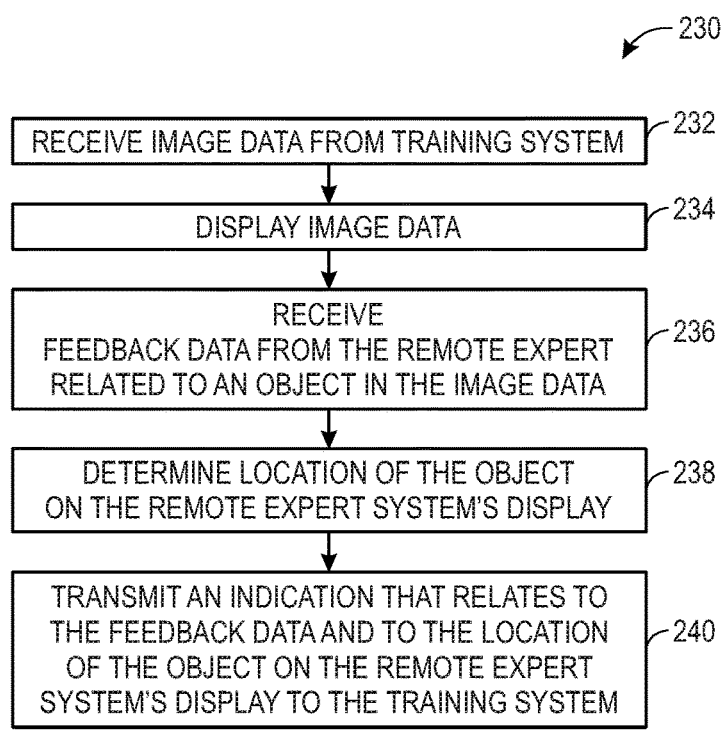
FIG. 6 is a flowchart of an embodiment of a method or process for transmitting feedback from a remote expert of a remote expert system to a training system of the training network, in accordance with an embodiment of the present disclosure.
Figure 7:
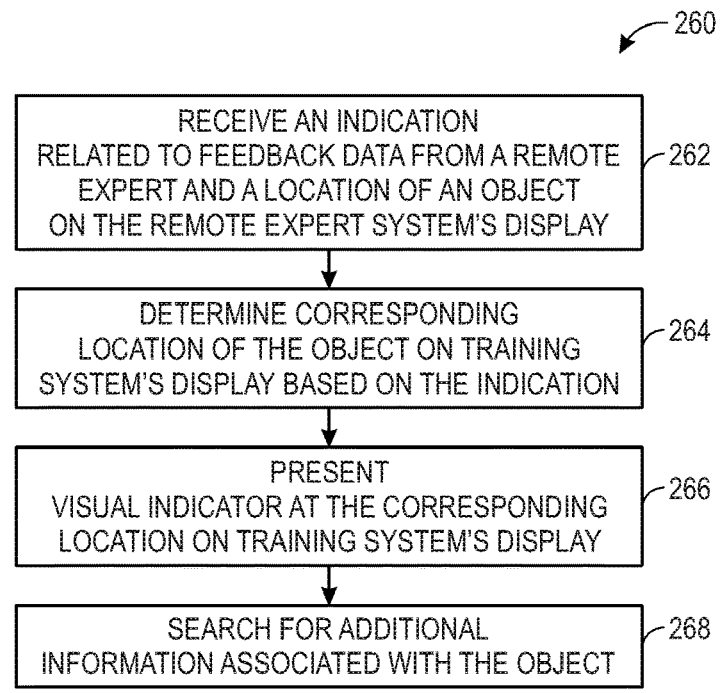
FIG. 7 is a flowchart of an embodiment of a method or process for adjusting image data presented by the training system based on feedback provided by the remote expert in relation to an object as viewed by the remote expert, in accordance with an embodiment of the present disclosure.
Figure 8:
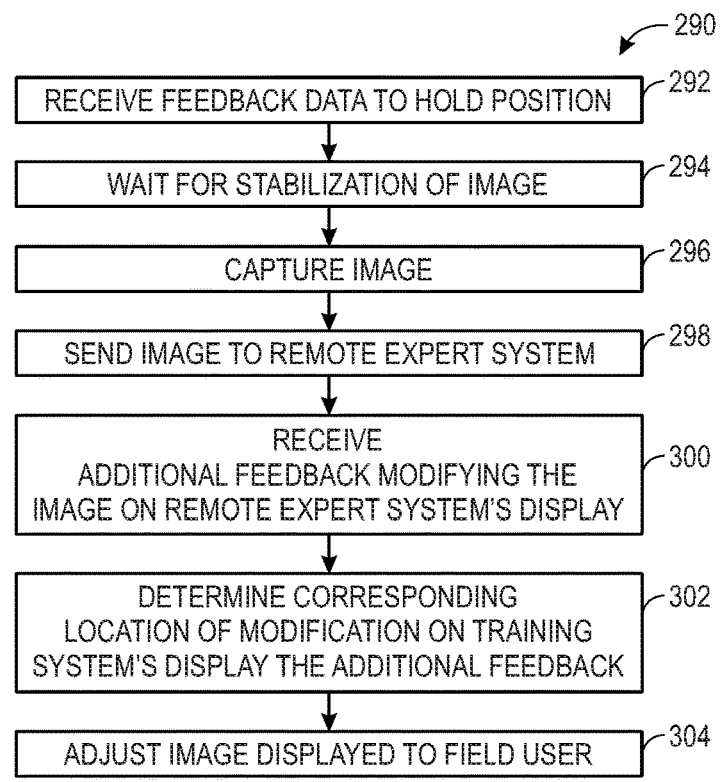
FIG. 8 is a flowchart of an embodiment of a method or process for adjusting the image data presented by the training system based on feedback provided by the remote expert to modify the image data, in accordance with an embodiment of the present disclosure.
Figure 9:
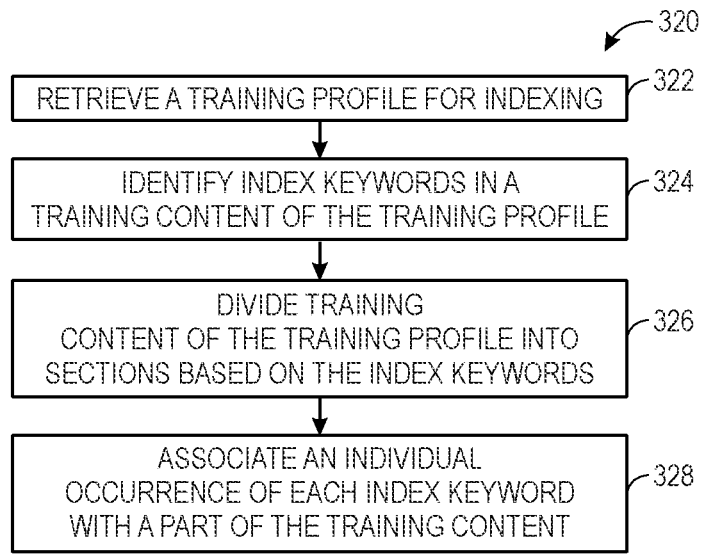
FIG. 9 is a flowchart of a method or process for indexing training content to associate index keywords of the training content with various parts of the training content, in accordance with an embodiment of the present disclosure.
Figure 10:
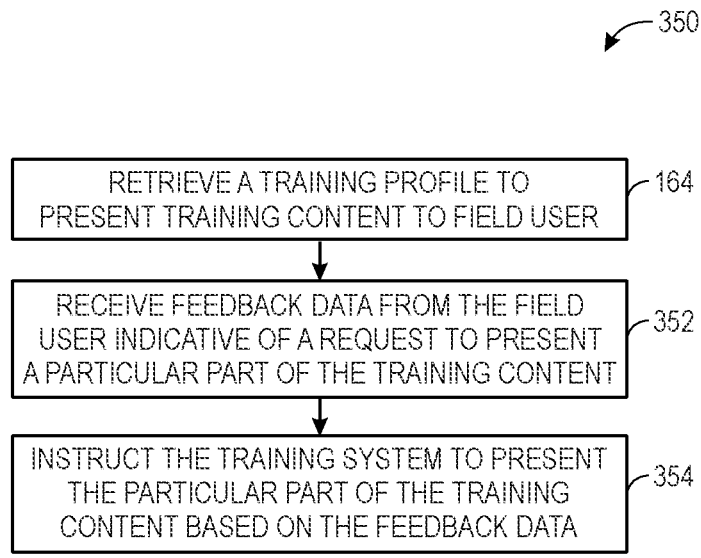
FIG. 10 is a flowchart of a method or process for presenting a part of a training content based on feedback data received from a field user.

FIGS. 3-10 pertain to various methods or processes that may be performed based on the features described in FIGS. 1 and 2. In particular, FIGS. 3-5 pertain to generating training content and creating training profiles based on an interaction between the field user 53 and the remote expert 63. FIGS. 6-8 pertain to adjusting an image displayed to the field user 53 based on feedback provided by the remote expert 63. FIGS. 9 and 10 are directed to dividing training content into different sections. It should be noted that each method may be performed differently than shown in the respective figures. For example, other steps may be performed in addition to the respective methods of FIGS. 3-10, or certain steps described in the respective methods may be modified, removed, or performed in a different order. Furthermore, although FIGS. 3-10 describe that each method is performed via a particular system, such as the training system 52, the remote expert system 64, and the virtual expert system 70, the respective methods of FIGS. 3-10 may be performed by any suitable computing system.

Generating Training Content

As mentioned above, the field user 53 may use the training system 52 to facilitate performing a desired task. The training system 52 may present (e.g., output, display) training material, such as instructions or information, that guides the field user 53 to perform the desired task. However, it may be difficult to continuously create and update training material that effectively enables the field user 53 to perform the desired task. For instance, it may be difficult to predict how the field user 53 may interpret different instructions, inquire about different information, and so forth. As such, the training material may not provide the field user 53 with sufficient information to complete the desired task. In some cases, the field user 53 may request for additional assistance and, as a result, may be placed in communication with a remote expert 63 who may provide the additional assistance. The remote expert 63 may use the remote expert system 64 to view real-world surroundings from the perspective of the field user 53 based on an image data acquired by cameras 102 disposed on the training system 52 and transmitted by the training system 52, as well as other data presented to the remote expert 63. By observing the real-world surroundings of the field user 53, the remote expert 63 may guide the field user 53 efficiently and effectively in supplement of or as an alternative to training material provided by the training system 52. However, it may be difficult to have a remote expert 63 who is readily available to communicate with the field user 53. For example, it may be costly to employ multiple remote experts 63 to ensure that at least one of the remote experts 63 is available at all times to assist the field user 53 when requested.

Thus, it is recognized that creating training material that assists the field user 53 without having a remote expert 63 readily available at all times may enable the field user 53 to perform the desired task effectively without continuously incurring a cost of generating and updating the training material. Accordingly, embodiments of the present disclosure are directed to creating training material based on an interaction between the field user 53 and the remote expert 63. For example, the training material may include training content generated based on feedback provided by the remote expert 63 and/or feedback provided by the field user 53. As such, the training material may include information related to guiding the field user 53 to perform the desired task based on an interaction between the field user 53 and the remote expert 63, as tracked via the training system 52. Furthermore, the training material may be stored and presented automatically to other field users 53 without having to connect the other field users 53 to a respective remote expert 63. Therefore, a cost associated with maintaining a number of remote experts 63 to be available to the field user 53 may be limited or reduced.

Figure 3:
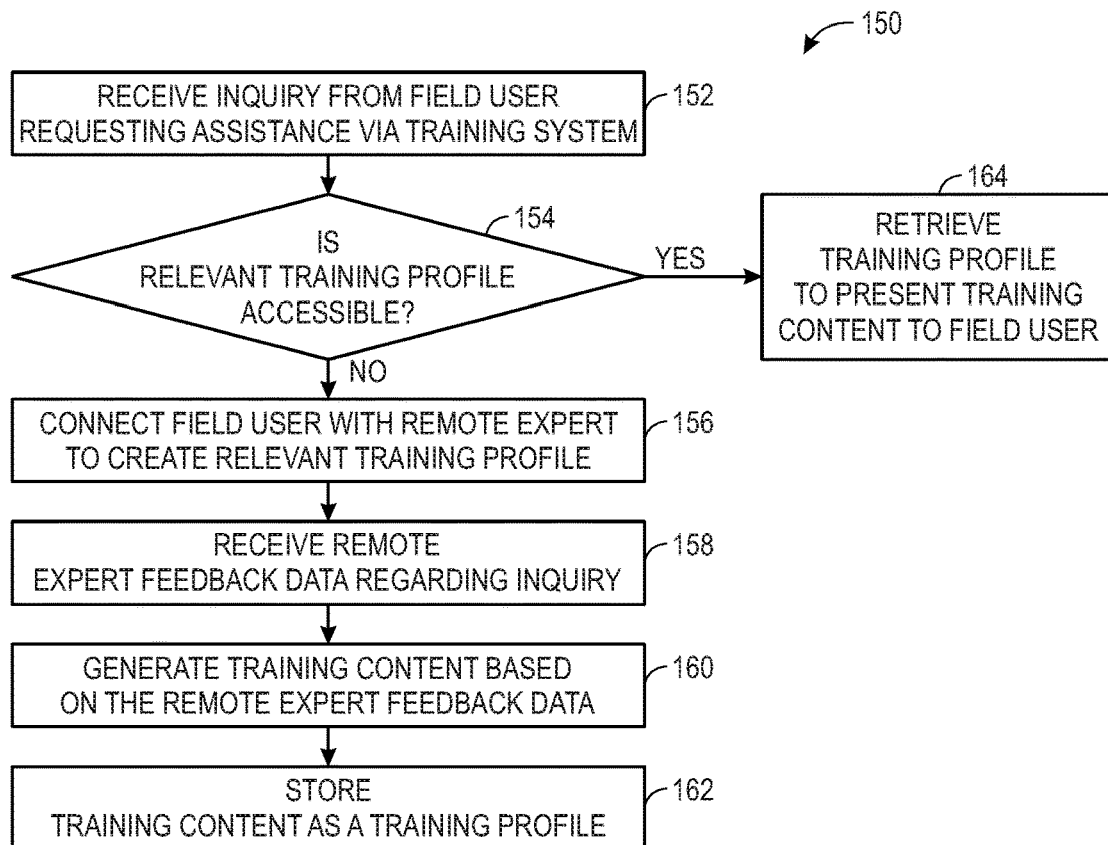
FIG. 3 is a flowchart of an embodiment of a method or process for creating a training profile to assist a field user to perform a desired task, in accordance with an embodiment of the present disclosure.

FIG. 3 is a flowchart of an embodiment of a method or process 150 for creating a training profile having training content that assists the field user 53 to perform a desired task. As described herein, the method 150 may be performed by the virtual expert system 70 but may be performed by any suitable computing system. At block 152, the virtual expert system 70 receives an inquiry from the field user 53 (e.g., transmitted by the training system 52) requesting additional assistance. The inquiry may be associated with a task that the field user 53 desires to complete. In some embodiments, the virtual expert system 70 may identify a verbal input (e.g., keywords, phrases) as a request for assistance. In additional embodiments, the virtual expert system 70 may identify certain gestural and/or text input as a request for assistance. As one example, the field user 53 may say, "I need help wiring this programmable logic controller (PLC) input on this contactor." The virtual expert system 70 may then identify the keyword "help" as a request for assistance.

At block 154, the virtual expert system 70 may determine if a relevant training profile is accessible in the database(s) 68 or the like based on the inquiry. As mentioned, each training profile may include training content, which may be a series of instructions or feedback that facilitate the field user 53 to perform an action. The training profile may include image data that may be overlaid or presented with real objects through electronic glasses, such that the field user 53 may view instructional text, computer-aided design models, videos, or other image data that may assist the field user 53 in performing the task. In addition, the training profile may include audio data, such as instructional recordings that guide the field user 53 in performing the respective task. Based on the inquiry, the virtual expert system 70 may identify and retrieve the relevant training profile. For instance, the field user 53 may send an inquiry that may include information or subject matter associated with the industrial system 60, the industrial device 62, a particular action, and the like. The virtual expert system 70 may then search the database(s) 68 to identify a training profile associated with the information to be displayed to the field user 53. Continuing the example above in which the field user 53 requests for assistance wiring the PLC input on the contactor, the virtual expert system 70 may use the keywords "wiring," "programmable logic controller input," and/or "contactor" to search for relevant training content related to a common relationship between these three keywords.

If the virtual expert system 70 determines that there is no relevant training profile, the virtual expert system 70 may proceed to block 156 and begin a process of creating a new training profile. At block 156, the virtual expert system 70 may connect the training system 52 of the field user 53 with the remote expert system 64. In some embodiments, the training system 52 is connected with a particular remote expert system 64 based on the inquiry sent by the field user 53. That is, the virtual expert system 70 may identify a particular remote expert 63 based on the information and/or subject matter included in the inquiry. For instance, the virtual expert system 70 may identify a specific remote expert 63 having experience or proficiency with the particular task desired to be completed by the field user 53. Then, via the communication link 66, the training system 52 may be placed in communication with the remote expert system 64 associated with the identified remote expert 63 and enable the field user 53 to communicate with the remote expert 63 and vice versa.

At block 158, the virtual expert system 70 may receive feedback data from the remote expert system 64 related to instructions provided to guide the field user 53 to complete the desired task. In some embodiments, the feedback data may include audio feedback, which may include spoken information (e.g., procedural instructions) to perform the desired task, provided by the remote expert 63. For example, the remote expert 63 may provide instructions to wire a +24V output of a power supply to a first terminal of the PLC, to jumper the first terminal of the PLC to a second terminal of the PLC, and to wire a third terminal of the PLC to a −24V output of the power supply. The training system 52 may present the audio feedback to be heard by the field user 53. In additional embodiments, the feedback data may include visual feedback, such as visual indicators (e.g., arrows), textual content, highlighting, computer-aided design models, resources (e.g., a manual), or any other suitable visual feedback provided by the remote expert 63 on the image data presented to the field user 53 via the training system 52 as computer-generated elements on the display 116. For instance, the remote expert 63 may provide an arrow to indicate the location of the first, second, and third terminals of the PLC and to indicate that the first terminal is to couple to the +24V output and the second terminal, and that the third terminal is to couple to the −24V output.

In some embodiments, the training system 52 may record the interaction between the field user 53 and the remote expert 63. That is, the training system 52 may capture the image data that is viewed by the field user 53 via the training system 52, including the image data and audio data feedback provided by the remote expert 63.

The training content may be generated and ordered chronologically based on an order of the occurrence of the relevant feedback provided by the remote expert 63. Additionally, each feedback data provided by the remote expert 63 may be organized to be separated from one another. For example, a first sentence of the training content verbally instructing the field user 53 to perform a first action (e.g., to wire the first terminal with the +24V output) may be separated (e.g., via a short pause) by a second sentence (e.g., to jumper the first terminal to the second terminal) verbally instructing the field user 53 to perform a second action. In this manner, the training content may be considered to include step-by-step instructions or directions to guide the field user 53 to perform the desired task, in which a respective pause may separate the steps from one another and enable the field user 53 to prepare for each upcoming step. The virtual expert system 70 may also identify when a final step has been provided by the remote expert 63. For instance, the remote expert 63 may say "Last, wire the third terminal to the −24V output," and the virtual expert system 70 may identify the keyword "last" to indicate that this is the final step provided by the remote expert 63. As a result, the virtual expert system 70 determines the remote expert 63 has provided all the instructions to enable the field user 53 to complete the task.

With the foregoing in mind, at block 160, the virtual expert system 70 may generate training content based on the feedback data received from the remote expert system 64. For instance, as discussed above, the virtual expert system 70 may record the audio feedback and/or the visual feedback provided by the remote expert 63 at block 158. The recorded feedback may then be used to generate the training content. By way of example, the feedback data received from the remote expert system 64 may include sentences spoken by the remote expert 63 to instruct the field user 53 to wire the +24V output to a first terminal of the PLC, to jumper the first terminal of the PLC to the second terminal of the PLC, and to wire the third terminal of the PLC to the −24V output. The virtual expert system 70 may record the sentences spoken by the remote expert 63 and may generate associated training content that includes the recording of the sentences to instruct another field user to wire the PLC input on the contactor. Additionally, the recorded feedback may be processed and/or manipulated to be used as training content. For example, audio feedback, such as the spoken sentence, may be adjusted to enunciate certain words, remove unnecessary content (e.g., pauses), and so forth. As such, the audio feedback may be presented using a robotic or synthesized voice that may be more easily understood by the field user 53, and/or the audio feedback may be presented via text and presented to the field user 53 via the training system 52.

At block 162, the virtual expert system 70 may organize the generated training content and store the generated content as a training profile. The training profile may be organized relative to other stored training profiles based on a certain characteristic of the training profile, such as a subject matter or type of relevant task, as to enable the training content to be retrieved more easily. For example, the virtual expert system 70 may identify keywords (e.g., wire, terminal) associated with the audio feedback data of the training content of the training profile, objects (e.g., PLC, contactor) associated with the image data of the training content, and so forth, to label the training profile with a particular characteristic. Thus, if a subsequent field user requests for assistance to complete a task, the virtual expert system 70 may evaluate the characteristic(s) of the training profile to determine whether the training profile is relevant to the field user to complete the task at hand. For instance, the virtual expert system 70 may compare the request with the wire, terminal, PLC, and contactor elements associated with the training profile to determine if the training profile is relevant to the request. In some embodiments, the training profile may be stored within the training system 52, such as within the memory 110, and may only be accessible by the training system 52. In additional embodiments, the training profile may be stored within the database(s) 68, and the training profile may be retrieved from other training systems 52 that are communicatively coupled to the database(s) 68.

As a result, the virtual expert system 70 is able to identify the field user 53 is requesting assistance, connect the field user 53 with the remote expert 63 of the remote expert system 64, receive feedback data provided by the remote expert 63 via the remote expert system 64 to generate training content, and store the training content as a training profile. The stored training content may be easily retrievable for future field users 53 requesting assistance, such that the virtual expert system 70 may automatically present instructions to the future field users 53 without having to connect the future field users 53 to another remote expert 63.

Referencing back to block 154, the virtual expert system 70 may identify the relevant training profile based on the request from the field user 53. For instance, if a subsequent field user 53 also requests for assistance wiring an additional PLC input of an additional contactor, the virtual expert system 70 may identify the request as being associated with another contactor and then determine whether the other contactor is associated with the stored training profile providing instructions on how to wire the PLC input of the first contactor. Upon identifying the relevant training profile by matching the respective labels, the virtual expert system 70 may then retrieve the training profile via the respective storage component. The virtual expert system 70 may then present training content of the training profile to the field user 53, such as by transmitting the training content to the training system 52 to present recorded visual feedback and/or audio feedback of the training content to the field user 53 via the display of the training system 52, as provided at block 164.

As discussed, the training content may be presented sequentially based on a time in which the feedback was provided by the remote expert 63 to generate the training content. The training content may be divided into steps or sections that guides the field user 53 to perform a particular action that facilitates completing the desired task. In some embodiments, the virtual expert system 70 may advance the field user 53 through each step after the virtual expert system 70 has verified that the field user 53 has completed the particular action associated with the step. Continuing the example from above, the virtual expert system 70 may transmit information related to performing a step to the training system 52 to instruct the field user 53 to perform an action that includes wiring the +24V output to the first terminal. The virtual expert system 70 may then pause to permit the field user 53 to perform the action, and the virtual expert system 70 may not advance to a subsequent step until the virtual expert system 70 has determined that the field user 53 has successfully wired the +24V output to the first terminal. For instance, the virtual expert system 70 may wait for an indication of confirmation from the field user 53 via image data or audio data. Alternatively, the virtual expert system 70 may visually detect that the step has been completed by analyzing the image data acquired by the training system 52 and a collection of images that correspond to the step being performed or completed. As an example, the virtual expert system 70 may identify a status or feature of the image data (e.g., taken from the camera(s) 102). That is, the virtual expert system 70 may identify the appearance of objects presented in the image data (e.g., relative to one another). For instance, the virtual expert system 70 may determine or verify whether the +24V output has been successfully wired to the first terminal based on a position of a wire relative to the +24V output and to the first terminal. Upon determining that the +24V output has been wired to the first terminal, therefore determining the associated verification step has been satisfied, the virtual expert system 70 may transmit the subsequent step of the respective process to the training system 52 to be presented to the field user 53, such as to perform a subsequent, different action. If the virtual expert system 70 has not determined the +24V output has been wired to the first terminal, the virtual expert system 70 may not advance to the following step and may not present further instructions until the field user 53 has completed the action. Other possible statuses or features of the image data include a visible feature presented in the image data, such as a visible light indication, a color of a particular object, and/or another suitable appearance of the objects presented in the image data that may provide some insight regarding whether a step has been completed.

In certain embodiments, the field user 53 may be enabled to override the verification step. That is, for example, if the field user 53 desires to skip a current step, the field user 53 may provide feedback (e.g., verbal, gestural) that causes the virtual expert system 70 to advance to the next step without having to determine that the field user 53 has completed the action associated with the current step. In this way, the associated verification step may be manually bypassed upon request by the field user 53.

Each verification step may be created based on the feedback data received from the remote expert system 64 and/or from the field user 53. As an example, the virtual expert system 70 may identify keywords within feedback data provided by the field user 53 and/or the remote expert 63 via the remote expert system 64 to initiate generating a verification step. Such keywords may include "let's check," "please verify," and the like. During the generation of the verification step, the virtual expert system 70 may use various inputs to determine how to identify an action has been completed. For example, the remote expert 63 may determine if an action has been completed by the field user 53 using the image displayed by the remote expert system 64. Upon verifying the action has been completed by the field user 53, the remote expert 63 may provide verification feedback, which may include audio feedback (e.g., the remote expert 63 may say "good") and/or visual feedback (e.g., the remote expert 63 may provide a thumbs up) indicative of the action being completed in a satisfactory manner. For instance, the remote expert 63 may ask to verify a machine is shutdown. The image data displayed by the training system 52 may depict that a light indicator as not being illuminated, thereby indicating that the machine is off, and the remote expert 63 may confirm the machine is shutdown.

In response to receiving the verification feedback, the virtual expert system 70 may then identify an appearance of objects displayed by the image data and/or sounds associated with audio data presented by the remote expert system 64 to represent the completed action, thereby creating baseline data or content (e.g., baseline image data, baseline audio data) related to the completed action and successfully creating the verification step. For instance, the virtual expert system 70 may capture the image data that shows the light indicator of the machine is off to use as baseline data when verifying whether other, similar machines are shutdown. Initiation of the verification step may cause the virtual expert system 70 to refer to the baseline data to verify subsequent completed actions. In other words, during the verification step when the training content is presented to an additional field user, the virtual expert system 70 may compare certain features of a currently presented data with identified features of the baseline data to determine if the additional field user has completed the action. If the virtual expert system 70 determines features of the currently presented data matches with the identified features of the baseline data, the virtual expert system 70 may then transmit additional data to the training system 52 to be presented to the field user 53.

In some embodiments, a completed action may be associated with multiple features of the image data and/or the audio data. Such features may include various appearances of objects, various sounds, and so forth, presented by the virtual expert system 70. However, a subset of the features may be satisfied to indicate a successfully completed action. By way of example, a lockout-tagout completion may be verified upon showing a lock is on a switch, a sensor indicating the lock is secured, and/or a light indication is displayed. The virtual expert system 70 may be designed to verify that the lockout-tagout procedure has been successfully completed upon identifying any two of the aforementioned features. In certain embodiments, the remote expert 63 may select which features and/or how many features are to be identified by the virtual expert system 70 to verify a completed action.

Additionally, the remote expert 63 may provide feedback to indicate that training content is to be generated later. For instance, while the remote expert 63 is providing instructions to the field user 53, the field user 53 may ask for information that is not readily available to the remote expert 63. As a result, the remote expert 63 may indicate that the generation of training content is to be paused to enable the remote expert 63 to retrieve the requested information. Thus, the virtual expert system 70 does not generate training content while the remote expert 63 is retrieving the information. Alternatively, the virtual expert system 70 may generate a bookmark or indication with regard to a time in which the pause request was received with respect to the training content. The virtual expert system 70 may continue to receive the feedback from the remote expert 63 after receiving a resume command, but the bookmark may be referred to later as a place to supplement or add content. For example, after the remote expert 63 has successfully retrieved the information, the remote expert 63 may then use the remote expert system 64 to provide remote expert feedback associated with the information to be used to update the training profile. In this way, the remote expert 63 may have greater control of (e.g., to pause operation of) the virtual expert system 70 so as to enable the virtual expert system 70 to generate more accurate training content.

FIG. 4 is a flowchart of an embodiment of a method or process 180 for pausing the generation of training content while the field user 53 is communicatively connected to the remote expert. Although FIG. 4 describes the virtual expert system 70 as performing the method 180 based on remote expert feedback data, the virtual expert system 70 may perform the method 180 based on user feedback data received from the field user 53 in additional embodiments. In some embodiments, the method 180 may be performed during the steps described at blocks 158 and 160 with reference to FIG. 3 while the virtual expert system 70 is creating a training profile. At block 182, the virtual expert system 70 receives remote expert feedback data regarding suspending the generation of training content for a section of the training content. For instance, the virtual expert system 70 may receive audio feedback (e.g., the remote expert 63 may say "pause" or "annotate"), visual feedback (e.g., the remote expert 63 holds a hand out), and the like.

As a result, the virtual expert system 70 may suspend generating training content, as indicated at block 184. While the generation of training content is suspended, the virtual expert system 70 may not receive expert feedback data from the training system 52 or remote expert feedback data from the remote expert system 64 to be used to generate training content. Thus, the field user 53 and the remote expert 63 may interact without the virtual expert system 70 generating training content based on the interaction. By way of example, the remote expert 63 may provide certain information or details that are not desirable to be included in the training profile, the remote expert 63 may search for additional information via the remote expert system 64 without having to be cautious regarding training content being generated while the remote expert 63 searches, the remote expert 63 and/or the field user 53 may take a pause or break in performing the task, and so forth. In certain embodiments, while generation of training content is suspended for the section, the section may be annotated or supplemented at a later time. For example, the remote expert 63 may provide remote expert feedback to indicate that computer codes are to be retrieved for the section, and the virtual expert system 70 may use the remote expert feedback to annotate the section, rather than to generate training content for the section. Thus, the remote expert 63 may use the annotations to determine what is desirable to be done for the section when generating the training content for the section at a later time.

In certain implementations, the virtual expert system 70 may suspend generating training content for only the particular section of the training profile as indicated by the remote expert feedback data. However, the remote expert 63 may indicate that other training content for other sections of the training profile is to be generated. For instance, the remote expert 63 may not immediately be able to provide information regarding a particular step of performing the task (e.g., the remote expert 63 has to look up computer codes to provide to the field user 53). However, such information may not be necessary for the remote expert 63 to instruct the field user 53 to perform additional steps associated with the task. Thus, the remote expert 63 may provide remaining remote expert feedback for the virtual expert system 70 to generate the training content for a remainder of the training profile.

At block 186, the virtual expert system 70 may receive additional remote expert feedback data indicative that training content is to be generated in the section in which generation of training content was suspended (e.g., at block 184). As an example, the remote expert 63 may have successfully retrieved relevant information (e.g., computer codes) to be provided for the field user 53. The additional remote expert feedback data may include audio feedback (e.g., the remote expert 63 says "resume"), visual feedback (e.g., the remote expert 63 gestures by waving hands), and/or any other suitable feedback to indicate that training content is now to be generated for the section.

In response, at block 188, the virtual expert system 70 resumes generating training content for the section. That is, the virtual expert system 70 may resume receiving remote expert feedback data from the remote expert system 64 and/or user feedback data from the training system 52, and the virtual expert system 70 may generate training content based on the received remote expert feedback data and/or the user feedback data. Such generated training content is to be implemented in the particular section that had been indicated at block 182. In this manner, the virtual expert system 70 may pause generation of training content for a desired section of the training profile, and then may generate training content for the desired section at a different time without affecting generating training content for remaining sections of the training profile.

In some circumstances, training content of a training profile may not sufficiently enable the field user 53 to perform the desired task. As an example, the instructions provided by the training content may be incomplete, incorrect, unclear, or otherwise insufficient. As a result, the field user 53 is not able to complete a particular step to complete the desired task. The virtual expert system 70 may identify inadequate training content of the training profile and may improve the training content to present information to the field user 53 in a better manner to complete the desired task.

With this in mind, FIG. 5 is an example flowchart of an embodiment of a method or process 200 for automatically adjusting a training profile (e.g., one of the training contents generated and stored via the steps described at FIG. 3) based on user feedback data to assist the field user 53 with completing a task. As an example, the training content of the training profile may be presented to the field user 53, as discussed with reference to block 164 of the method 150. While the training content is presented, the virtual expert system 70 may monitor the communication between the field user 53 and the remote expert 63. As such, the virtual expert system 70 may receive feedback data from the field user 53, as indicated at block 202. The field user 53 may provide feedback in response to viewing certain training content, such as certain instructions presented to the field user 53, and the training system 52 may capture the user feedback to provide user feedback data to the virtual expert system 70.

At block 204, the virtual expert system 70 may determine if the feedback data provided by the field user 53 is indicative of a variant or unexpected response to a step or portion of the presented training content. In other words, the virtual expert system 70 may identify if the user feedback data is expected (e.g., indicative that an action has successfully been completed) or unexpected (e.g., indicative of an issue pertaining to the training content). For example, the virtual expert system 70 may receive audio feedback, which may include features such as keywords, phrases, speech tone and/or pitches, and the like and determine if such audio feedback corresponds to expected feedback or unexpected feedback. In another example, the virtual expert system 70 may determine other features of the user feedback data, (e.g., the movement of the field user 53, a feature of content presented by the training system 52) to determine if the user feedback data corresponds to expected feedback or unexpected feedback. To determine whether the user feedback data corresponds to expected feedback or unexpected feedback, the virtual expert system 70 may compare the received features with features associated with previous feedback. As an example, the virtual expert system 70 may determine that the current field user 53 is providing verbal feedback indicative that they are using the incorrect screwdriver to wire the first terminal to the +24V output, whereas a previous field user 53 had provided verbal feedback indicative they had successfully wired the first terminal to the +24V output. Thus, the virtual expert system 70 determines the verbal feedback provided by the current field user 53 is different than the verbal feedback provided by the previous field user 53, thereby identifying that the verbal feedback provided by the current field user 53 is a variant response.

If the received user feedback data corresponds to expected user feedback data, the virtual expert system 70 may proceed to block 206 and continue to present the remaining training profile. That is, the virtual expert system 70 may proceed to transmit the subsequent training content to the training system 52 to be presented to the field user 53.

However, if the virtual expert system 70 does determine that the user feedback data is indicative of a variant response, the virtual expert system 70 may determine adjustments to be made to the training profile based on the user feedback data, as depicted at block 208. In some embodiments, the virtual expert system 70 may identify the features of the user feedback data (e.g., keywords spoken by the field user 53, gestures given by the field user 53) to determine the adjustments to be made to the training profile. Based on the features of the user feedback data, the virtual expert system 70 may initially determine that there is an issue experienced by the field user 53. Then, the virtual expert system 70 may analyze the features of the user feedback data and/or the image data, such as objects related to the issue, to determine how to mitigate the issue. That is, the virtual expert system 70 may determine the instructions and/or the objects causing the issue and how the instructions may be clarified or otherwise changed with respect to the objects to reduce the probability of the issue occurring. For example, in response to receiving training content that instructs the field user 53 to wire the +24V output to the first terminal, the field user 53 may provide feedback data indicating that a currently available screwdriver cannot sufficiently wire the +24V output to the first terminal. The virtual expert system 70 may analyze the feedback data to determine that the issue is related to not having the right screwdriver to wire the +24V output to the first terminal. The virtual expert system 70 may then determine that a specific screwdriver type and/or size should be used to wire the +24V output to the first terminal. Therefore, the virtual expert system 70 may use the additional information to adjust the instructions or training content to include the specific screwdriver and avoid occurrences of this issue for future field users.

At block 210, the virtual expert system 70 may update the training profile based on the determined adjustments. For instance, the virtual expert system 70 may change the training content that caused the field user 53 to respond with the user feedback indicative of a variant response. By way of example, the training content may be updated to instruct the field user 53 to wire the +24V output to the first terminal using the specific screwdriver type and/or size identified via the step describe at block 208.

At block 212, the virtual expert system 70 stores the updated training profile that was adjusted based on the user feedback data. The updated training profile may override and replace the previous training profile (i.e., the training profile that was not adjusted). Thus, the updated training profile may be retrieved and presented to the field user 53 via the training system 52, and the field user 53 may no longer provide feedback indicative of the variant response to the updated training profile. In this manner, stored training profiles may be dynamically updated and changed to limit or reduce subsequent user feedback indicative of variant responses, thereby improving the training content to enable the field user 53 to perform the desired task.

It should be noted that, in certain implementations, the virtual expert system 70 may perform the steps described at blocks 208-212 after receiving a certain threshold number of received user feedback data that each indicated a variant response. In other words, the virtual expert system 70 may update the training profile after receiving multiple user feedback responses that each indicated a variant response. By way of example, the virtual expert system 70 may present training content to a first field user and may receive a first user feedback data indicative of a variant response from the first field user. However, the virtual expert system 70 may not update the training profile after receiving the first user feedback data. At a separate occasion, the virtual expert system 70 may present training content to a second field user and may receive a second user feedback data indicative of a variant response from the second field user. The first user feedback data and the second user feedback data may be associated with a similar issue or subject matter associated with the training content. As a result of receiving both the first user feedback data and the second user feedback data, the virtual expert system 70 may then perform the steps of blocks 208-212 to update the training content based on the first and second user feedback data. In additional implementations, the virtual expert system 70 may update the training profile after receiving a certain threshold number of user feedback data that each indicates a variant response, such as three user feedback responses, five user feedback responses, and so forth, thus improving the training content and optimizing the training profile.

It should also be noted that, in addition to storing the updated training profile upon receiving feedback data indicative of a variant response, the virtual expert system 70 may send information (e.g., a notification, a log of events) to a third-party, including a manufacturer, a supplier, and the like. For instance, the field user 53 may be assembling the industrial device 62, which may be provided by a kit, with the assistance of the remote expert 63, and the kit does not specify or include the particular screwdriver to be used for assembling the industrial device 62. Therefore, the field user 53 may provide the user feedback indicative that a currently used screwdriver may not be utilized to assemble the industrial device 62. Based on the user feedback, the virtual expert system 70 may send information to the manufacturer of the industrial device 62 to include the particular screwdriver in the kit to enable subsequent field users to have the particular screwdriver readily available when assembling industrial device 62. Moreover, the virtual expert system 70 may use the feedback data indicative of a variant response to update a resource stored in the database 68. By way of example, the virtual expert system 70 may add information to the resource of the database 68 based on the feedback data, and when the resource is subsequently accessed (e.g., via the remote expert 63, such information may be presented to the field user 53 and avoid a subsequent variant response.

In additional embodiments, the virtual expert system 70 may determine adjustments to be made to the training profile based on a certain end result, instead of feedback data indicative of a variant response. For example, after the field user 53 has completed the desired task by using the training profile, the virtual expert system 70 may evaluate a current status of the completed task. The virtual expert system 70 may compare the current status of the desired task with previous statuses of previously completed tasks. If the virtual expert system 70 determines that the current status of the desired task is an improvement to the previous statuses (e.g., the current status is a better quality, the current status was achieved in a quicker manner), the virtual expert system 70 may determine adjustments to be made to the training profile to enable subsequent field users 53 to complete subsequent tasks and achieve the current status. For instance, the virtual expert system 70 may determine the difference between actions taken by the field user 53 to complete the current task to actions taken by previous field users 53 to complete the previous tasks. The virtual expert system 70 may then update the training profile based on the determined difference, such as by changing the instructions of the training content to guide future field users 53 to perform the particular actions taken by the field user 53, rather than actions taken by previous field users 53.

In further embodiments, the remote expert 63 may review the training profile and may confirm the training profile and/or adjust the training content based on the review. For example, after the virtual expert system 70 has generated or updated the training profile, the virtual expert system 70 may transmit the training profile to the remote expert system 64 to be presented to the remote expert 63. The remote expert 63 may then manually update the training profile by editing the image data, audio data, and so forth, of the training content associated with the training profile, such as by changing instructions to be presented by the training system 52. After the remote expert 63 is satisfied with the training profile, the remote expert 63 may transmit the updated training profile to the virtual expert system 70, and the virtual expert system 70 may save the updated training profile into the database(s) 68. That is, in some embodiments, the remote expert 63 or other suitable entity may provide a final approval that allows the training content to be made available or published.

Performing Multiple Operations Based on a Single Command from Remote Expert

While the training system 52 is communicating with the remote expert system 64, the remote expert 63 may desire to modify the image displayed by the training system 52 to the field user 53 to help the field user 53 perform the desired task. For instance, the remote expert 63 may desire to direct the attention of the field user 53 to a certain object in the real-world surrounding and/or to a virtual element. However, it may be difficult for the remote expert 63 to modify the image displayed by the training system 52 as desired, because the remote expert 63 may be trying to perform multiple actions simultaneously. In some circumstances, it may be difficult for the remote expert 63 to provide multiple types of feedback (e.g., verbal feedback to the field user 53 and visual feedback regarding what is being displayed via the training system 52) simultaneously to the field user 53. By way of example, the remote expert 63 may not be able to guide the field user 53 to view a certain object in the real world, while also trying to modify the image displayed to the field user 53, such as to label the certain object with a visual indicator, because the remote expert 63 may not be able to locate a particular object present in the image while the field user 53 is moving and the image is presented to the remote expert 63 via the remote expert system 64 in real-time. That is, the image displayed by the training system 52 may be constantly changing, and the position of the particular object may also be constantly changing based on movement of cameras 102 acquiring the image data. As such, the remote expert 63 may have difficulty locating the particular object. For such reasons, the remote expert 63 may not be able to effectively assist the field user 53 to perform the desired task.

Thus, some embodiments of the present disclosure may address these issues based on a method that enables the remote expert system 64 to perform multiple actions or convey different information based on an individual command. For example, the remote expert 63 may provide a verbal feedback to the remote expert system 64. Based on the verbal feedback, the remote expert system 64 may communicate with the training system 52 to cause the training system 52 to facilitate adjusting the image presented to the field user 53 to enable the remote expert 63 to provide visual feedback to the field user 53. For example, based on a verbal command provided to the field user 53 by the remote expert 63, the remote expert system 64 may automatically locate an object viewed by the remote expert 63 and may transmit an indication to the training system 52 to enable the training system 52 to modify the image data presented to the field user 53 to focus on or highlight the object. Thus, the remote expert 63 avoids providing a specific command to adjust the image presented to the field user 53 in addition to instructing the field user 53 to perform some action. In this manner, the remote expert 63 may focus on providing feedback a single time to communicate multiple commands and better facilitate the field user 53 to perform the desired task.

With this in mind, FIG. 6 is a flowchart of an embodiment of a method or process 230 for transmitting feedback from a remote expert 63 of the remote expert system 64 to the training system 52. The steps of the method 230 may be performed by the remote expert system 64 while the remote expert system 64 is communicatively coupled with the training system 52. In one example, the method 230 may be performed when training content is being generated by the virtual expert system 70, such as during the steps described with reference to blocks 158 and 160 in FIG. 3. In another example, the method 230 may be performed after the training content has been generated, but the field user 53 may have requested for additional assistance and is placed in communication with the remote expert system 64.

At block 232, the remote expert system 64 receives image data from the training system 52. In other words, the image data displayed by the training system 52 to the field user 53 is sent to the remote expert system 64, such as via the communication link 66. The image data may include the real-world surroundings of the field user 53 acquired by the cameras 102 of the training system 52 and/or virtual elements generated by the training system 52 or other suitable computing system. As a result of receiving the image data, the remote expert system 64 displays the received image data to the remote expert 63, as shown at block 234. In this regard, the remote expert 63 is able to view the same image data presented to the field user 53.

At block 236, the remote expert system 64 may receive feedback data submitted by the remote expert 63. The feedback data may relate to or be associated with a particular object in the received image data. For example, during the interaction between the field user 53 and the remote expert 63, the remote expert 63 may instruct the field user 53 to wire the +24V output to the first terminal. However, the field user 53 may not know where the first terminal is located in the real-world surroundings of the field user 53. As such, the remote expert system 64 may preemptively determine a location of the first terminal based on data received by the interaction between the remote expert 63 and the remote expert system 64.

For example, at block 238, the remote expert system 64 determines the location of the object as presented on the display of the remote expert system 64 based on the data regarding one or more properties of the remote expert 63 with respect to the remote expert system 64. In one embodiment, the remote expert system 64 may determine the location of the object by determining an area on the display that is being viewed by the remote expert 63 when the expert is providing the feedback data. For instance, the remote expert system 64 may determine an orientation of the eyes of the remote expert 63 when providing the feedback (e.g., audio feedback). Based on the determined orientation of the eyes, the remote expert system 64 may further determine a location of the object on the display of the remote expert system 64 at which the remote expert 63 is viewing.

With regard to embodiments in which the feedback includes the tactile interaction between the remote expert 63 and the display of the remote expert system 64, the remote expert system 64 may determine a location at which the remote expert 63 interacted with the display. For instance, the remote expert system 64 may include a tactile sensor that detects physical contact (e.g., tactile feedback data) between the remote expert 63 and the display, a position sensor that determines a position and/or orientation of the remote expert 63, and/or another suitable sensor to determine where the remote expert 63 contacted the display.

At block 240, the remote expert system 64 transmits an indication related to the location of the object on the remote expert system's display as determined at block 238 to the training system 52. The indication may additionally include the feedback data provided by the remote expert 63 at block 236. The training system 52 may then use the indication to adjust the image presented to the field user 53 or provide additional virtual objects on the image, as will be further discussed in FIG. 7.

Returning to the example described above, the training system 52 may receive data regarding the location of an object specified in an instruction to another field user 53 without the remote expert 63 separately providing an input to the remote expert system 64 related to the location of the first terminal. In this way, the presently disclosed embodiments avoid waiting for the field user 53 requesting additional instructions from the remote expert 63 related to the location of the object, waiting for the remote expert 63 to provide feedback to the remote expert system 64 related to the location of the object, and the like.

After the remote expert system 70 has performed the steps of the method 260, such that the training system 52 receives the indication transmitted at block 240, the training system 52 may then use the indication to modify the image displayed to the field user 53. FIG. 7 is a flowchart illustrating an embodiment of a method or process 260 for modifying the image presented by the training system 52 based on feedback provided by the remote expert 63 in relation to an object. For example, the steps of the method 260 may be performed by the training system 52 in response to the remote expert system 64 transmitting the indication that relates to the feedback data and to the location of the object on the display of the remote expert system 64, as described in block 240 of FIG. 6. At block 262, the training system 52 receives the indication transmitted by the remote expert system 64.

At block 264, the training system 52 determines a corresponding location of the object on the image presented by the training system 52 based on the indication received at block 262. In some embodiments, the indication may include a modified image data, and the training system 52 may compare the modified image data received from the remote expert system 64 with the image data of the image currently presented by the training system 52 to the field user 53. For instance, the training system 52 may compare respective pixels of the modified image data of the remote expert system 64 with respective pixels of the image data of the training system 52. The training system 52 may match a first plurality of pixels associated with the modified features or portions of the image data of the remote expert system 64 with a corresponding second plurality of pixels of the image data of the training system 52. The second plurality of pixels may be associated with various features or portions of the image data of the training system 52. Thus, the training system 52 may determine the corresponding location of the features or portions of the image data based on the second plurality of pixels.

At block 266, the training system 52 may present a visual indicator at the corresponding location on the image displayed by the training system 52 to indicate the object that the remote expert 63 had modified or is currently highlighting (e.g., pointing) via the remote expert system 64. By way of example, after the remote expert 63 instructs the field user 53 to look at the arrow in response to the field user 53 asking where the first terminal is located, the training system 52 may display an arrow pointing at the first terminal with respect to the image data presented to the field user 53. In additional embodiments, the training system 52 may present a different type of visual indicator (e.g., a circle surrounding the object) to indicate the location of the object to the field user 53. It should be noted that the visual indicator may remain anchored in the image displayed by the training system 52 with the object associated with the visual indicator. In other words, the training system 52 may present the visual indicator at a particular location, such as adjacent to the object, even as the image data view changes. That is, as the field user 53 changes perspectives, such that the location of the object in the image presented by the training system 52 has changed, the training system 52 may also move the displayed visual indicator accordingly, such as to remain adjacent to the object.

At block 268, the training system 52 may further search for information associated with the object indicated by the visual indicator. Such information may include a resource (e.g., stored in the database(s) 68), data, or other relevant information, to provide additional assistance to the field user 53. In an example, the training system 52 may search for an image of the first terminal and may overlay the image of the first terminal onto the image data, such that the field user 53. Thus, the field user 53 may view the visual indicator drawn by the training system 52 as well as an example of another first terminal to assist the field user 53 in locating the first terminal.

In this example, the training system 52 performs multiple operations related to present a visual indicator and/or further information to the field user 53 based on a single command provided by the remote expert 63 via the remote expert system 64. Since the training system 52 automatically presents the visual indicator and/or further information, the remote expert 63 no longer has to provide the command to the field user 53 to look at an object, locate the object on the image data, draw the visual indicator via the remote expert system 64 such that the training system 52 displays the visual indicator, and retrieve a resource that contains additional information to present to the field user 53. In this way, the training system 52 may reduce an occurrence of unintended feedback data (e.g., erroneous instructions) provided by the remote expert 63, thereby providing clearer instructions to assist the field user 53 in performing the task.

In another example, the remote expert 63 may desire to capture a particular perspective viewed by the field user 53. For instance, the field user 53 may be viewing a particular section of the contactor, and the remote expert 63 desires to provide additional visual indicators to label components of the contactor located at the particular section. However, it may be difficult for the remote expert 63 to provide the visual indicators while the field user 53 and, therefore, the image data is moving. Thus, the remote expert 63 may provide a single command for the field user 53 to maintain a position, and the training system 52 may perform multiple operations, including determining when the image is stabilized, capturing the image, and providing the image to the remote expert 63, such that the remote expert 63 may analyze or perform certain operations to assist the field user 53 using the image.

With this in mind, FIG. 8 is a flowchart of an embodiment of a method or process 290 for adjusting the image presented by the training system 52 based on feedback provided by the remote expert 63 to modify an image. The steps of the method 290 may be performed by the training system 52 while the training system 52 is in communication with the remote expert system 64, such that the field user 53 is interacting with the remote expert 63. At block 292, the training system 52 may receive feedback from the remote expert 63 to hold a position. For example, the remote expert 63 may instruct the field user 53 to hold the position via a verbal input and/or a text input, and the training system 52 may identify keywords in the input indicative of an instruction to hold the position.

At block 294, as a result of detecting that instructions were provided from the remote expert 63 to the field user 53 hold the position, the training system 52 may wait for a stabilization of the image presented to the field user 53. In other words, the training system 52 may wait until an orientation of the field user 53 remains substantially steady, such that the image presented to the field user 53 is not blurred or otherwise affected by movement of the field user 53. After the training system 52 determines the image presented to the field user 53 has stabilized, the training system 52 may capture the image, as shown at block 296. That is, the training system 52 may obtain a single image representative of the image (e.g., a still picture or a static image) presented to the field user 53 when the field user 53 generally ceases movement. It should be noted that the capturing of the image performed by the training system 52 occurs based on the detection of a keyword or command directed at the field user 53—not a specified command related to capturing the image.

At block 298, the training system 52 may send the captured image to the remote expert system 64, such as via the communication link 66. As a result, the remote expert 63 may view the captured image, which may not be affected by the current orientation of the field user 53, and the field user 53 may view the image presented by the training system 52 in real-time. The remote expert 63 may then modify the captured image and provide additional feedback, which may include certain visual indicators that may help the field user 53 perform the desired task. For example, the additional feedback may label a particular object present in the captured image, provide information at a certain location in the captured image, and the like.

At block 300, the training system 52 receives the additional feedback, which may be used to modify the captured image, provided by the remote expert 63. For example, the training system 52 may receive an image that incorporates the additional feedback provided by the remote expert 63 at a particular location of the captured image. At block 302, the training system 52 then determines the corresponding location of the additional feedback on the image currently being displayed to the field user 53 based on the captured image displayed to the remote expert 63. For instance, the training system 52 may match features of the image data of the training system 52 with features of the modified image data of the remote expert system 64 via the comparison of colors or objects as previously described. As such, the training system 52 may determine an orientation of the image data presented to the field user 53 relative to the modified image data, positions of various objects in the image data presented to the field user 53 relative to the positions of the objects in the modified image data, and so forth. In an additional example, the training system 52 may include a movement sensor (e.g., accelerometer) and/or a position sensor (e.g., infrared sensor) that determines a particular orientation of the field user 53. The training system 52 may then compare a first orientation of the field user 53 associated with the captured image sent to the remote expert system 64 with a second orientation of the field user 53 associated with a current image that is displayed by the training system 52 to the field user 53. That is, the training system 52 may determine the second orientation of the field user 53 relative to the first orientation of the field user 53. As such, the training system 52 may determine the location of the additional feedback (e.g., associated with the first orientation) relative to the features of the current image displayed to the field user 53 (e.g., associated with the second orientation).

At block 304, the training system 52 may adjust the image displayed to the field user 53 based on the steps performed at block 300 and 302. That is, the training system 52 incorporates the additional feedback provided by the remote expert 63 into the image that is currently presented to the field user 53. For instance, the training system 52 may display visual indicators with which the remote expert 63 modified the captured image and at the corresponding location determined at block 302. In this manner, the field user 53 may view the additional feedback at the intended locations provided by the remote expert 63, as based on the orientation of the field user 53.

It should be noted that the training system 52 may be able to receive and identify a different feedback provided by the remote expert 63, and automatically adjust the image presented to the field user 53 based on the different feedback. For example, the remote expert 63 may provide feedback associated with a resource, such as a manual that includes information relevant to performing the desired task. The remote expert system 64 may receive the feedback provided by the remote expert 63 and may transmit the feedback to the training system 52. As a result of receiving the feedback transmitted by the remote expert system 64, the training system 52 may retrieve the resource (e.g., from the database (s) 68) and display the resource to the field user 53, such as by overlaying the resource on the image presented to the field user 53. In this way, the remote expert 63 does not have to retrieve the resource manually and may focus on providing feedback to the field user 53.

Although FIGS. 6-8 primarily discuss identifying a location of an object on the display of the remote expert system 64 and then identifying a corresponding location of the object on the display of the training system 52, it should be noted that identification of a location on a display may be bidirectional. In other words, in some embodiments, a location of an object on the display of the training system 52 may be identified and then a corresponding location of the object on the display of the remote expert system 64 may be identified. For example, the remote expert 63 may be viewing a captured image presented by the remote expert system 64 and the field user 53 may be viewing a real-time image presented by the training system 52. The field user 53 may provide feedback that causes the training system 52 to generate a visual indicator at a location on the image displayed to the field user 53. The training system 52 may transmit the location to the remote expert system 64, which then determines the corresponding location on the image displayed to the remote expert 63. The remote expert system 64 may then adjust the image displayed to the remote expert 63 at the determined location.

Furthermore, the virtual expert system 70 may perform other actions based on the feedback provided by the remote expert 63 and/or the field user 53. In an example, the virtual expert system 70 may receive audio feedback that includes the keyword "zoom" and may magnify the image data presented to the remote expert 63 and/or the field user 53. In another example, the virtual expert system 70 may receive feedback indicating audio content is to be output, such as by receiving audio feedback that includes the keywords "listen to this resource," and the virtual expert system 70 may retrieve the relevant resource to present the associated audio content to the remote expert 63 and/or the field user 53.

Training Content Index

In some situations, it may be desirable for the training system 52 to present specific training content or a particular portion of a training profile. As described above, the training system 52 may present the training content via a video, text, audio content, and/or visual indicators to the field user 53. In some embodiments, such as for training content presented via a video demonstrating performed actions, each part of the training content may be presented individually and sequentially to the field user 53. However, the field user 53 may desire to receive specific training content (e.g., associated with completing a particular action or with a particular object) without having to receive or view other parts of the training content. For example, the field user 53 may desire the training system 52 to present training content of the training profile associated with a particular timestamp or time interval without having to receive or view remaining parts of the training content. Thus, the field user 53 may receive and view relevant instructions and/or information more efficiently. For this reason, the virtual expert system 70 may index the respective training content of the training profiles, or associate parts of the training content with various identifiers, such as keywords.

FIG. 9 is a flowchart of a method or process 320 for indexing training content to associate index keywords of the training content with various parts of the training content, such as time intervals (e.g., for a video), steps (e.g., for instructional text), topics (e.g., for visual indicators providing information), and so forth. At block 322, the virtual expert system 70 retrieves an existing training profile (e.g., from the database 68) that may have been created via the method 150. In some embodiments, the virtual expert system 70 may retrieve each created training profile for indexing to associate the respective training content with various identifiers. As such, each training profile stored in some storage component may be indexed. In additional embodiments, the virtual expert system 70 may retrieve a subset of training profiles for indexing. For instance, the field user 53 may select particular training profiles, and the virtual expert system 70 may retrieve the selected training profiles to index their respective training content.

At block 324, the virtual expert system 70 analyzes the training content of the retrieved training profile to identify index keywords in the training content. In one embodiment, there may be a pre-determined collection of index keywords (e.g., stored in the database 68) that the virtual expert system 70 may recognize, and the virtual expert system 70 may identify the occurrence or usage of each of the index keywords within the training content. For example, the collection of index keywords may include the chronological terms, such as "First," "Next," "Last," each indicative of a transition of parts of the training content from one set of instructions to another set of instructions. In an additional embodiment, the virtual expert system 70 may identify certain keywords of the training profile as index keywords based on a quantity of occurrences of the keyword, such as a number of total occurrences in the training content being greater than some occurrence threshold and/or a number of occurrences within a certain time period or duration of a portion of the training content being greater than another occurrence threshold. As an example, the virtual expert system 70 may determine that a training content video includes the term "wire" three times within a time interval of thirty seconds. As a result, the virtual expert system 70 identifies "wire" as an index keyword. To this end, there may also be a collection of keywords that cannot be used as index keywords. For instance, the collection of excluded index keywords may include common words (e.g., "the," "is") that do not directly pertain to the desired task associated with the training profile. Thus, even if the virtual expert system 70 determines the occurrence of the collection of excluded index keywords, the virtual expert system 70 will not identify such words as index keywords to avoid dividing the training content into unnecessary parts.

At block 326, the virtual expert system 70 divides the training content into various sections, which may include one or more blocks of time, one or more steps, one or more displayed visual indicators, and the like, based on the identified index keywords. Each of the sections is available for selective playback or presentation. In some embodiments, the virtual expert system 70 may divide the training content into separate steps or instructions to perform a respective action. By way of example, the virtual expert system 70 may divide the training content into a first step having the content, "First, wire the first terminal of the PLC to the +24V output of the power supply," a second step having the content "Next, jumper the first terminal of the PLC to the second terminal of the PLC," and a third step having the content "Last, wire the third terminal of the PLC to the −24V output of the power supply." Thus, the training content is divided into the first step, the second step, and the third step.

Additionally or alternatively, the virtual expert system 70 may identify certain categories or topics associated with the index keywords and, as a result, divide the training content into sections associated with the identified categories. For instance, the virtual expert system 70 may identify the index keyword "wire" occurs multiple times in a first time interval of the training content video, and the virtual expert system 70 may therefore correspond the first time interval with actions associated with wiring. In another example, the virtual expert system 70 may identify the index keywords "3.5 millimeter (mm) Phillips screwdriver" occur multiple times in a second time interval of the training content video, and the virtual expert system 70 may correspond the second time interval with actions performed using a 3.5 mm Phillips screwdriver. In a further example, the virtual expert system 70 may identify the index keywords "2.5 mm hex screwdriver" occur multiple times in a third time interval of the training content video, and the virtual expert system 70 may correspond the third time interval with actions performed using a 2.5 mm hex screwdriver. Therefore, the training content is divided into the first section (e.g., having a first set of instructions) associated with the wire, the second section (e.g., having a second set of instructions) associated with the 3.5 mm Phillips screwdriver, and the third section (e.g., having a third set of instructions) associated with the 2.5 mm hex screwdriver. In this manner, various sections of the training content may correspond with different categories that are relevant to completing the desired task. Furthermore, in some cases, certain sections may overlap with one another. For instance, a certain time interval of the first section associated with wiring may overlap with another time interval of the second section associated with using the 3.5 mm Phillips screwdriver (e.g., a step includes using the 3.5 mm Phillips screwdriver to facilitate wiring two components together). For this reason, the virtual expert system 70 may further divide the training content into an additional section associated with occurrences of both "wire" and "3.5 mm Phillips screwdriver." As such, a single section may be associated with multiple different index keywords.

At block 328, the virtual expert system 70 may also associate an individual occurrence of each index keyword with a part of the training content. In other words, the virtual expert system 70 identifies a part of the training content containing the index keyword, and the virtual expert system 70 may correspond that part of the training content with one occurrence of the index keyword. For example, the virtual expert system 70 may identify a first occurrence of the term "wire" at a first time of the training content video, and the virtual expert system 70 assigns the first time with a first timestamp. The virtual expert system 70 may also determine a second occurrence of "wire" at a second time of the training content video, and the virtual expert system 70 assigns the second time with a second timestamp. In further embodiments, the virtual may identify the first occurrence of the term "wire" is at a first step of the training content, and the virtual expert system 70 may earmark the first step with the first occurrence of "wire." The virtual expert system 70 may also determine the second occurrence of "wire" is at a third step of the training content, and the virtual expert system 70 may earmark the third step with the second occurrence of "wire." In any case, the individual occurrences of each index keyword may be located within the training content.

Although the illustrated method 320 primarily discusses indexing existing training content, additional embodiments of the method 320 may include indexing training content while the training content is being created. In other words, the virtual expert system 70 may use feedback data (e.g., provided by the field user 53 and/or the remote expert 63 via the remote expert system 64) to generate training content and also to dynamically associate parts of the training content with index keywords of the feedback data. In this way, after the virtual expert system 70 has completed creating the training content, the training content may already be indexed. Further still, the index keywords may be updated, such as by a remote expert 63 of the remote expert system 64. In response to the updated index keywords, the virtual expert system 70 may retrieve training profiles stored in the database 68 to update the respective plurality of sections of the respective training profiles based on the updated index keywords.

It should also be noted that textual content may be produced based on the training profile created via the method 320. For example, the virtual expert system 70 may identify keywords associated with the remote expert feedback data and/or the user feedback data in the training content, and may create textual instructions based on such keywords. In some embodiments, the voice data provided via the remote expert feedback may be transcribed and used for the textual content. Furthermore, the virtual expert system 70 may structure the textual instructions based on the sections in which the training content is divided. By way of example, the virtual expert system 70 may divide the textual content into step-by-step instructions, each step associated with a particular section of the training content. Additionally, the virtual expert system 70 may use the remote expert feedback data and/or the user feedback data to include additional information other than textual instructions. Such additional information may include other resources and/or guidelines to be presented along with the textual instructions.

FIG. 10 is a flowchart of a method or process 350 for presenting a part of the training content based on feedback data received from the field user 53. The method 350 begins with the virtual expert system 70 retrieving a training profile to be presented to the field user 53, as shown at block 164. That is, the virtual expert system 70 may determine that the field user 53 requests for assistance with a desired task, the virtual expert system 70 may identify and retrieve a training profile relevant to the desired task, and the virtual expert system 70 may transmit the training profile to the training system 52 to be presented to the field user 53.

At block 352, the virtual expert system 70 receives feedback data from the field user 53 via the training system 52, in which the feedback data is indicative of a request to present a particular part of the training content. In some embodiments, the feedback data may include audio feedback provided by the field user 53. In one example, the field user 53 may request for a particular step of the training content, such as by saying "Present the second step." In another example, the field user 53 may request for a particular section of the training content, such as by saying "Present the actions for the 3.5 mm Phillips screwdriver." In additional embodiments, the field user 53 may search or browse through different parts of the training content and select a desired part to be presented by the training system 52. For instance, in response to determining the field user 53 indicated a desire for the training system 52 to present a certain part of the training content (e.g., the field user 53 provides audio feedback to view parts of the training content), the training system 52 may present an image that includes visual indicators representing the various parts of the training content. For instance, in response to the field user 53 saying "Show topics of the instructions," the training system 52 may present visual indicators representing each section of the training content and the respectively associated topic of each section. As another example, in response to the field user 53 saying "Show occurrences of the word 'wire,'" the training system 52 may present the parts (e.g., each step) of the training content where the term "wire" is used. In alternative examples, the visual indicators may represent a timestamp of the training content, steps of the training profile, and so forth. The field user 53 may then indicate a selection of a certain part of training content. By way of example, the field user 53 may provide audio feedback indicating the certain part as described above (e.g., "Present the second step") and/or may perform a gesture (e.g., pointing a finger) interacting with the image of the visual indicators representing the certain of the training content.

At block 354, the virtual expert system 70 instructs the training system 52 to present the part of the training system based on the feedback data received at block 352. In some embodiments, the virtual expert system 70 determines keywords of audio feedback provided by the field user 53 to determine which part of the training content is requested by the field user 53. For example, the virtual expert system 70 determines the keyword "present" as a request for presenting a specific part of the training content, and the virtual expert system 70 determines the keywords "second step" as a request for presenting the second step of the training content in particular. The training system 52 may then identify a time interval, a content, or another suitable identifier of the training content associated with the second step, and the training system 52 may then instruct the training system 52 to present the training content associated with the identifier (e.g., to skip the first step and directly present the second step). In additional embodiments, the virtual expert system 70 may identify the request for presenting the specific part of the training content based on the gesture of the field user 53. For instance, the virtual expert system 70 determines the location of a finger of the field user 53 relative to the image of the visual indicators representing the parts of the training content. The virtual expert system 70 may determine the location of the finger is most proximate to the visual indicator representing the second step. As a result, the virtual expert system 70 determines the identifier of the training content associated with the second step and instructs the training system 52 to present the training content associated with the identifier, thereby presenting the second step of the training content to the field user 53. In this way, the training system 52 directly presents the relevant part of the training content as requested by the field user 53.

While only certain features of the disclosure have been illustrated and described herein, many modifications and changes will occur to those skilled in the art. It is, therefore, to be noted that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A non-transitory computer-readable medium comprising computer-executable instructions that, when executed by at least one processor, are configured to cause the at least one processor to:

retrieve a first training profile of a plurality of training profiles from a database, wherein the first training profile comprises instructions to perform an operation for an industrial automation component;

determine that respective training content of the first training profile comprises at least a portion of a plurality of index keywords stored in a database, wherein the respective training content comprises audio data, video data, or both;

identify, within the respective training content, a plurality of sections associated with the at least a portion of the plurality of index keywords based on the at least a portion of the plurality of index keywords being stored in the database; and divide the first training profile into the plurality of sections in response to identifying the plurality of sections, wherein each of the plurality of sections is selectable for playback.

2. The non-transitory computer-readable medium of claim 1, wherein the computer-executable instructions, when executed by the at least one processor, are configured to:

identify a plurality of timestamps of the respective training content, wherein each timestamp of the plurality of timestamps is associated with an index keyword of the at least a portion of the plurality of index keywords; and identify the plurality of sections based on the plurality of timestamps.

3. The non-transitory computer-readable medium of claim 1, wherein the respective training content is associated with a plurality of keywords, and wherein the computer-executable instructions, when executed by the at least one processor, are configured to:

determine a quantity of occurrences of a keyword of the plurality of keywords within the respective training content; and identify the keyword of the plurality of keywords as an index keyword of the at least a portion of the plurality of index keywords in response to determining the quantity of occurrences of the keyword exceeds an occurrence threshold.

4. The non-transitory computer-readable medium of claim 1, wherein the computer-executable instructions, when executed by the at least one processor, are configured to:

identify a respective topic associated with each index keyword of the plurality of index keywords; and identify the plurality of sections based on the respective topics.

5. The non-transitory computer-readable medium of claim 1, wherein each section of the plurality of sections is associated with a single index keyword of the at least a portion of the plurality of index keywords.

6. The non-transitory computer-readable medium of claim 1, wherein the computer-executable instructions, when executed by the at least one processor, are configured to access the database storing the plurality of index keywords to determine that the at least a portion of the plurality of index keywords of the respective training content are stored in the database.

7. The non-transitory computer-readable medium of claim 1, wherein each section of the plurality of sections comprises a block of time, a set of steps, a set of visual indicators, or any combination thereof.

8. The non-transitory computer-readable medium of claim 1, wherein the computer-executable instructions, when executed by the at least one processor, are configured to:

receive an inquiry from a user, wherein the inquiry comprises a request for assistance to perform the operation associated with the first training profile;

retrieve the first training profile from the database based on the inquiry; and present the respective training content of the first training profile to the user.

9. The non-transitory computer-readable medium of claim 8, wherein the computer-executable instructions, when executed by the at least one processor, are configured to:

receive feedback data from the user, wherein the feedback data comprises an index keyword of the at least a portion of the plurality of index keywords;

identify a section of the plurality of sections associated with the index keyword; and present the section of the first training profile associated with the index keyword.

10. A method, comprising:

receiving, via a processor, an inquiry from a user, wherein the inquiry comprises a request for assistance to perform a first operation of one or more operations for one or more industrial automation components;

retrieving, via the processor, a selected training profile from a database based on the inquiry, wherein the selected training profile is associated with the first operation of the one or more operations for the one or more industrial automation components;

identifying, via the processor, a plurality of sections of the selected training profile, wherein the plurality of sections is associated with a plurality of index keywords and is previously divided between one another based on the plurality of index keywords being stored in a database, wherein each of the plurality of sections is selectable for playback;

presenting, via the processor, the plurality of sections of the selected training profile;

receiving, via the processor, feedback data from the user, wherein the feedback data is indicative of a request to select one of the plurality of sections of the selected training profile;

presenting, via the processor, a plurality of visual indicators to the user in response to receiving the feedback data, wherein the plurality of visual indicators is associated with the plurality of sections;

receiving, via the processor, image data representative of a portion of the user moving within a threshold distance of a visual indicator of the plurality of visual indicators;

identifying, via the processor, a selected section of the plurality of sections associated with the visual indicator of the plurality of visual indicators based on the portion of the user moving within the threshold distance of the visual indicator as represented in the image data; and presenting, via the processor, the selected section.

11. The method of claim 10, wherein each section of the plurality of sections corresponds to a respective timestamp of the selected training profile, and presenting the selected section of the selected training profile comprises presenting, via the processor, training content of the selected training profile associated with a first timestamp corresponding to the selected section associated with the visual indicator of the plurality of visual indicators.

12. The method of claim 10, wherein the plurality of sections is associated with a plurality of topics of the selected training profile, steps of the selected training profile, timestamps of the selected training profile, occurrences of each index keyword of the plurality of index keywords in the selected training profile, or any combination thereof.

13. The method of claim 10, comprising:

receiving an updated plurality of index keywords stored in the database;

retrieving an additional training profile from the database, wherein the additional training profile comprises a second plurality of sections associated with the plurality of keywords and previously divided between one another based on the plurality of index keywords being stored in the database, wherein each of the second plurality of sections is selectable for playback; and update the second plurality of sections divided between one another based on the updated plurality of index keywords being stored in the database.

14. A system, comprising:

a database configured to store a plurality of index keywords; and a virtual expert system communicatively coupled to the database, wherein the virtual expert system comprises at least one processor configured to:

receive feedback data from a remote expert system, wherein the feedback data comprises instructions provided by a user to perform an operation for one or more industrial automation components;

generate a training profile based on the feedback data, wherein the training profile is associated with the operation for the one or more industrial automation components;

determine that the feedback data comprises a subset of the plurality of index keywords stored in the database;

identify a plurality of sections of the training profile based on the subset of the plurality of index keywords of the feedback data in response to determining that the feedback data comprises the subset of the plurality of index keywords stored in the database;

divide the training profile into the plurality of sections in response to identifying the plurality of sections, wherein each section of the plurality of sections is available for playback; and store the training profile on the database.

15. The system of claim 14, wherein the at least one processor of the virtual expert system is configured to:

receive an inquiry from a user, wherein the inquiry is associated with performing the operation for the one or more industrial automation components;

retrieve the training profile from the database;

present the training profile to the user via a training system;

receive user feedback data indicative of a selection of one of the plurality of sections via the training system; and send data representative of the one of the plurality of sections to the training system to be presented to the user.

16. The system of claim 14, wherein the at least one processor of the virtual expert system is configured to:

identify keywords associated with the training profile;

generate textual content based on the keywords; and organize the textual content based on the plurality of sections.

17. The system of claim 14, wherein the subset of the plurality of index keywords is associated with a chronological term, a topic, a timestamp, or any combination thereof.

18. The system of claim 14, wherein the virtual expert system is configured to:

retrieve an existing training profile of a plurality of training profiles from an additional database;

determine that training content of the existing training profile comprises an additional subset of index keywords stored in the database, wherein the training content comprises audio data, video data, or both;

identify an additional plurality of sections based on the additional subset of index keywords in response to determining that the training content comprises the additional subset of index keywords stored in the database; and divide the existing training profile into the additional plurality of sections, wherein each section of the additional plurality of sections is selectable for playback.

* * * * *